(12) United States Patent
Meguro

(10) Patent No.: US 6,778,418 B2
(45) Date of Patent: Aug. 17, 2004

(54) POWER-SUPPLY VOLTAGE FREQUENCY CONTROL CIRCUIT

(75) Inventor: Tetsumasa Meguro, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/291,735

(22) Filed: Nov. 12, 2002

(65) Prior Publication Data

US 2004/0090808 A1 May 13, 2004

(51) Int. Cl.[7] ............................................. H02M 5/00
(52) U.S. Cl. ...................................................... 363/165
(58) Field of Search ................................. 363/157, 159, 363/165; 327/39, 41, 44, 46, 113, 291, 293, 295

(56) References Cited

U.S. PATENT DOCUMENTS 6,348,780 B1 * 2/2002 Grant .......................... 323/222
6,437,302 B1 * 8/2002 Bowers ........................ 219/661
6,608,521 B1 * 8/2003 Baldwin et al. ............... 330/10

* cited by examiner

Primary Examiner—Matthew V. Nguyen
(74) Attorney, Agent, or Firm—Rader, Fishman & Grauer PLLC; Ronald P. Kananen

(57) ABSTRACT

A power-supply voltage frequency control circuit capable of changing a clock frequency in accordance with processing and assuring an operation of a target circuit when supplying a power-supply voltage in accordance therewith, comprising a clock supply circuit capable of supplying a system clock of a plurality of clock frequencies and supplying a system clock having a clock frequency in accordance with a first control signal to a target circuit performing processing in synchronization with the system clock, a power-supply voltage supply circuit for supplying a power-supply voltage of a value in accordance with a second control signal to the target circuit, and a control circuit for outputting the first control signal to the clock supply circuit and a second control signal to the power-supply voltage supply circuit by following an instruction of a frequency change value and a change time from the target circuit.

28 Claims, 18 Drawing Sheets

FIG. 4

| CLOCK FREQUNECY | POWER-SUPPLY VOLTAGE |
|---|---|
| f0 | V0 |
| f1 | V1 |
| f2 | V2 |
| f3 | V3 |

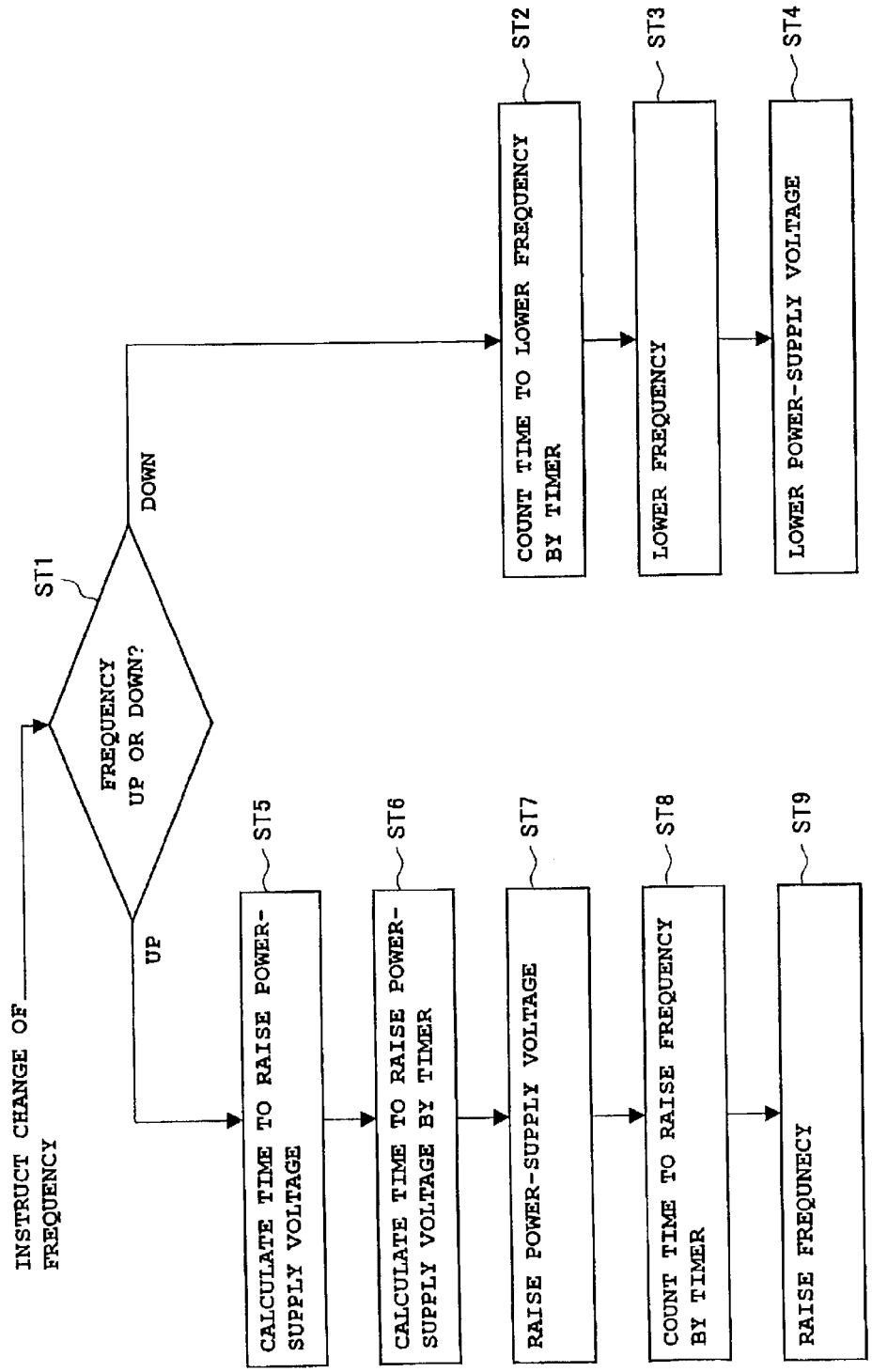

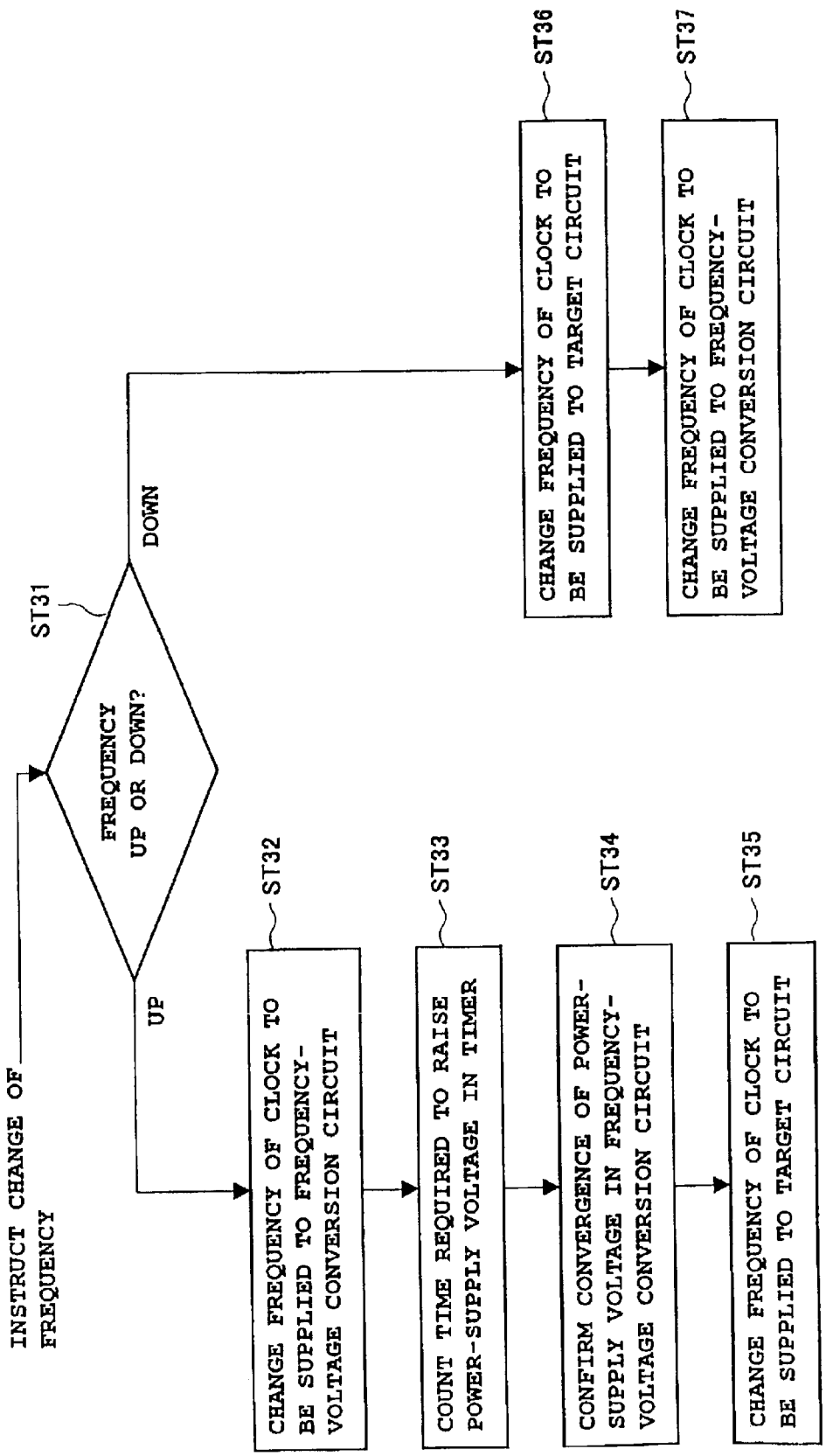

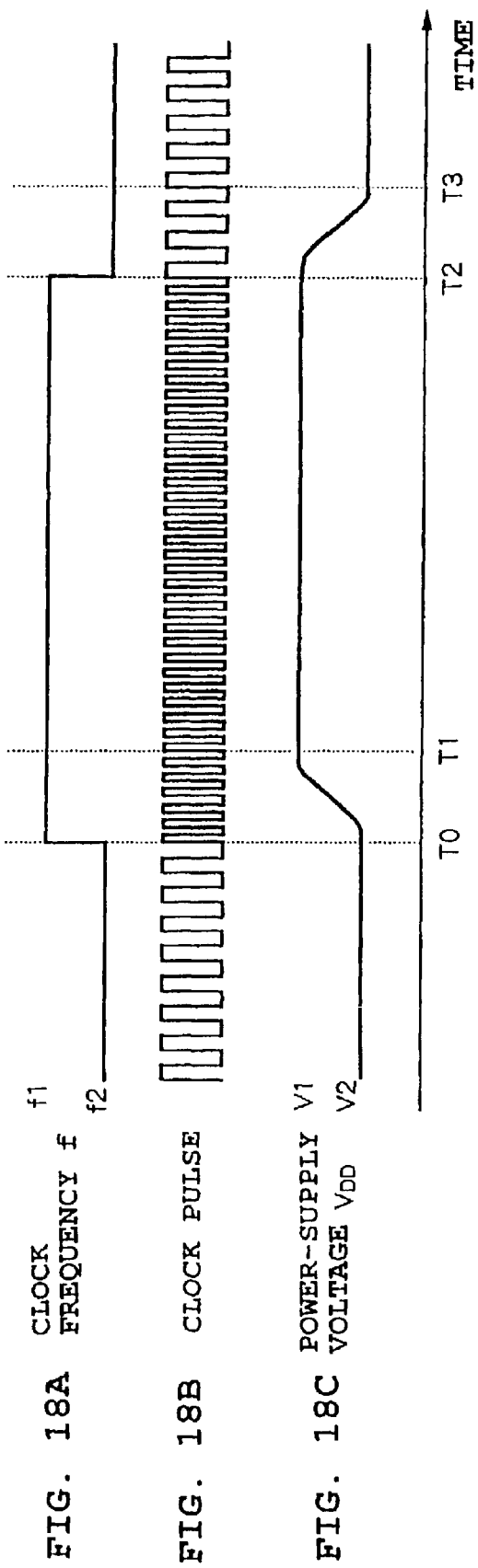

POWER-SUPPLY VOLTAGE FREQUENCY CONTROL CIRCUIT

BACKGROUND OF THE INVENTION

1. Field of the Invention

The present invention relates to a power-supply voltage frequency control circuit for controlling a clock frequency of a system clock and a power-supply voltage to be supplied to a target circuit receiving the supply of a predetermined power-supply voltage and performing predetermined processing in synchronization with a system clock.

2. Description of the Related Art

The power consumption of an electronic circuit system is proportional to the clock frequency and the square of a power-supply voltage. Thus, by changing the clock frequency in accordance with a load of tasks to be processed based on the operating state of the system and supplying power-supply voltage in accordance thereto, the power consumption can be reduced.

Specifically, when the load is heavy, that is, when there are many tasks for the target circuit to process, a high power-supply voltage $V_{DD}$ is supplied and a high speed clock frequency is switched to.

When the load is light, that is, when there are few tasks for the target circuit to process, a low speed clock frequency is switched to and a low power-supply voltage $V_{DD}$ is supplied.

For example, when the lower limit power-supply voltage $V_{DD}$ able to assure operation of the target circuit at the time of a clock frequency f of f1 is V1 and the lower limit power-supply voltage $V_{DD}$ able to assure operation of the target circuit at the time of a clock frequency f of f2 (<f1) is V2 (<V1), a power-supply voltage $V_{DD}$ of V1 or more is supplied when the system clock frequency f is f1, while a power-supply voltage $V_{DD}$ of V2 or more is supplied when the system clock frequency f is f1 which is lower than f2.

By doing this, excessive power consumption can be suppressed.

However, a certain period of time is necessary to change the power-supply voltage $V_{DD}$. For example, as shown in FIG. 18A to FIG. 18C, up until the time T1 when the power-supply voltage $V_{DD}$ is converged to V1, a clock of a frequency f1 is supplied to the target circuit, but a power-supply voltage $V_{DD}$ for assuring the operation thereof is not supplied, so the operation of the target circuit is not assured.

Accordingly, as explained above, in the electronic circuit system of the related art, there is the disadvantage that sometimes the operation cannot be assured when operating the system while switching the frequency.

Also, when changing the clock frequency in accordance with the load of tasks to be processed by the target circuit based on an operating state of the system as explained above and supplying a power-source voltage $V_{DD}$ in accordance thereto, a CPU or other control circuit gives an instruction every time, whereby a clock supply circuit capable of supplying a clock of a variable clock frequency or a power-supply circuit capable of supplying a variable power-source voltage changes the clock frequency f and the power-supply voltage $V_{DD}$.

In this case, the CPU is generally configured to give an instruction at a predetermined time. To the predetermined time, however, interruption processing by a timer becomes necessary. In this case, the CPU suspends the processing of the tasks it should be performing.

Accordingly, in an electronic circuit system of the related art, when controlling the clock frequency and power-supply voltage in accordance with a fixed schedule, there is the disadvantage that the processing of tasks is suspended each time and an overhead of processing for sending instructions to the clock supply circuit and the power-supply voltage supply circuit occurs.

SUMMARY OF THE INVENTION

A first object of the present invention is to provide a power-supply voltage frequency control circuit capable of assuring operation of a target circuit when changing a clock frequency in accordance with a load of tasks to be processed and supplying a power-supply voltage in accordance thereto.

A second object of the present invention is to provide a power-supply voltage frequency control circuit capable of suppressing an occurrence of overhead in processing and reducing processing of a control system of a target circuit when controlling a clock frequency and a power-supply voltage in accordance with a fixed schedule.

To attain the above objects, according to a first aspect of the present invention, there is provided a power-supply voltage frequency control circuit comprising a clock supply circuit capable of supplying system clocks of a plurality of clock frequencies and supplying a system clock having a clock frequency in accordance with a first control signal to a target circuit performing processing in synchronization with the system clock; a power-supply voltage supply circuit for supplying a power-supply voltage of a value in accordance with a second control signal to the target circuit; and a control means for, when giving an instruction for raising the frequency, instructing the power-supply voltage supply circuit by the second control signal to raise the power-supply voltage in advance to one by which operation of the system can be assured for the frequency to be changed to next and then instructing the clock supply circuit by the first control signal to raise the frequency.

Preferably, the control means, when giving an instruction for lowering the frequency, instructs the clock supply circuit by the first control signal to lower the frequency and instructs the power-supply voltage supply circuit by the second signal to lower the power-supply voltage to one by which operation of the system can be assured for the frequency to be changed.

According to a second aspect of the present invention, there is provided a power-supply voltage frequency control circuit comprising a clock supply circuit capable of supplying system clocks of a plurality of clock frequencies and supplying a system clock of a clock frequency in accordance with a first control signal to a target circuit performing processing in synchronization with the system clock; a power-supply voltage supply circuit for supplying a power-supply voltage of a value in accordance with a second control signal to the target circuit; and a control means for outputting the first control signal to the clock supply circuit and outputting the second control signal to the power-supply voltage supply circuit by following an instruction of a frequency change value and change time from the target circuit.

Preferably, the control means calculates a power-supply voltage value to be supplied to the target circuit from the frequency change value instructed by the target circuit and instructs the power-supply voltage supply circuit by the second control signal.

Alternatively, the control means has a table of the relationship of a frequency value of a system clock to be supplied to the target circuit and a power-supply voltage value to be supplied to the target circuit, selects a voltage in accordance with an instructed frequency value, and instructs the power-supply voltage supply circuit by the second control signal.

Alternatively, the control means performs a frequency-voltage conversion from an instructed frequency value of a system clock to be supplied to the target circuit and instructs a power-supply voltage value obtained by the conversion to the power-supply voltage supply circuit by the second control signal.

Alternatively, the circuit further comprises a timer able to be set with a time to be clocked by the control means and outputting a coincidence signal clocking the set time, and the control means sets a frequency change time instructed by the target circuit to the timer and outputs the first control signal to the clock supply circuit when receiving as an input the coincidence signal from the timer.

Alternatively, the control means compares a frequency of the clock supplied by the clock supply circuit with the frequency change value instructed by the target circuit, judges whether to raise or lower the frequency in accordance with the comparison result, and instructs the clock supply circuit by the first control signal.

More preferably, when judging to raise the frequency, the control means outputs to the power-supply voltage supply circuit the second control signal to raise the power-supply voltage at an earlier time than an instructed time and outputs to the clock supply circuit the first control signal to raise the system clock frequency to an instructed frequency value at the instructed time.

Alternatively, when judging to lower the frequency, at an instructed time, the control means outputs to the clock supply circuit the first control signal to lower the system clock frequency to an instructed frequency value and outputs to the power-supply voltage supply circuit the second control signal to lower the power-supply voltage.

Alternatively, the control means outputs to the power-supply voltage supply circuit the second control signal to raise the power-supply voltage at an earlier time than an instructed time and outputs to the clock supply circuit the first control signal to raise the system clock frequency to an instructed frequency value at an instructed time when judging to raise the frequency, while outputs to the clock supply circuit the first control signal to lower the system clock frequency to an instructed frequency value at an instructed time and outputs to the power-supply voltage supply circuit the second control signal to lower the power-supply voltage when judging to lower the frequency.

More preferably, the circuit further comprises a timer able to be set with a time to be clocked by the control means and outputting a coincidence signal for clocking the set time, and the control means calculates a time to raise the power-supply voltage from a time of raising the frequency, sets a time based on the calculated time to the timer, and outputs the second control signal to the power-supply voltage supply circuit when receiving as an input the coincidence signal from the timer.

According to a third aspect of the present invention, there is provided a power-supply voltage frequency circuit comprising a frequency-voltage conversion circuit for judging whether a power-supply voltage is high or low relative to a supplied clock frequency and outputting a voltage instruction signal to instruct to lower the power-supply voltage when higher and to raise it when lower; a control means for outputting a control signal to instruct a frequency change in accordance with an instruction of the frequency change value; a clock supply circuit capable of supplying system clocks of a plurality of clock frequencies and supplying a system clock of a clock frequency in accordance with the control signal separately to a target circuit for performing processing in synchronization with the system clock and to the frequency-voltage conversion circuit; and a power-supply voltage supply circuit for supplying a power-supply voltage in accordance with the voltage instruction signal to the target circuit and frequency-voltage conversion circuit.

Preferably, when receiving an instruction to raise the frequency, the control means instructs the clock supply circuit by the control signal to raise a clock frequency to be supplied to the frequency-voltage conversion circuit and to raise a clock frequency to be supplied to the target circuit after the elapse of a time sufficient time for the power-supply voltage to rise.

Alternatively, when receiving an instruction to lower the frequency, the control means instructs the clock supply circuit by the control signal to lower the clock frequency to be supplied to the target circuit and then to lower the clock frequency to be supplied to the frequency-voltage conversion circuit.

Alternatively, when receiving an instruction to lower the frequency, the control means instructs the clock supply circuit by the control signal to simultaneously lower the clock frequency to be supplied to the frequency-voltage conversion circuit and the clock frequency to be supplied to the target circuit.

Alternatively, the control means instructs the clock supply circuit by the control signal to raise the clock frequency to be supplied to the frequency-voltage conversion circuit and to supply to the target circuit after the elapse of a time sufficient for the power-supply voltage to rise when receiving an instruction to raise the frequency and instructs the clock supply circuit by the control signal to lower the clock frequency to be supplied to the target circuit and then to lower the clock frequency to be supplied to the frequency-voltage conversion circuit when receiving an instruction to lower the frequency.

Alternatively, the control means instructs the clock supply circuit by the control signal to raise the clock frequency to be supplied to the frequency-voltage conversion circuit and to raise the clock frequency to be supplied to the target circuit after the elapse of a time sufficient for the power-supply voltage to rise when receiving an instruction to raise the frequency and instructs the clock supply circuit by the control signal to simultaneously lower the clock frequency to be supplied to the frequency-voltage conversion circuit and the clock frequency to be supplied to the target circuit when receiving an instruction to lower the frequency.

More preferably, the circuit further comprises a timer able to be set with time to be clocked by the control means and for outputting a coincidence signal for clocking the set time, and the control means calculates a time to raise the power-supply voltage from a time of raising the frequency, sets a time based on the calculated time at the timer, and instructs the clock frequency circuit by the control signal to raise the clock frequency to be supplied to the target circuit when receiving as an input the coincidence signal from the timer.

Alternatively, the control means detects that the power-supply voltage has risen, confirms that the power-supply voltage has risen, then instructs the clock supply circuit by the control signal to raise the clock frequency to be supplied to the target circuit.

More preferably, the circuit further comprises a timer able to be set with time to be clocked by the control means and outputting a coincidence signal clocking the set time, and the control means calculates a time to raise the power-supply voltage from a time of raising the frequency, sets a time based on the calculated time to the timer, receives as input the coincidence signal from the timer, detects that the power-supply voltage has risen, confirms that the power-supply voltage has risen, then instructs the clock supply circuit by the control signal to raise the clock frequency to be supplied to the target circuit.

According to the present invention, for example, when instructing to raise the frequency, the control means instructs the power-source voltage supply circuit by the second control signal to raise the power-supply voltage in advance to one capable of assuring operation of the system for the frequency to be changed to next, then instructs the clock supply circuit by the first control signal to raise the frequency.

Namely, the control means also considers the setup time required for the power-supply voltage supply circuit to change the power-supply voltage. When switching from a low frequency to a high frequency, it instructs the power-supply voltage supply circuit by the second control signal to raise the power-supply voltage to one in accordance with the high frequency at a point earlier from that timing by exactly the setup time.

Also, when instructing to lower the frequency, the control means instructs the clock supply circuit by the first control signal to lower the frequency and instructs the power-supply voltage supply circuit by the second control signal to lower the power-supply voltage to one capable of assuring operation of the system for the frequency to be changed to next.

Accordingly, the system operation can be assured even when switching the frequency.

Also, according to the present invention, for example, when lowering the system clock frequency at a predetermined time, a target circuit supplies a frequency change instruction including time information to the control means.

When the control means receives a frequency change instruction from the target circuit, it judges whether to perform an operation for increasing (raising) the frequency or an operation for decreasing (lowering) the frequency from the frequency instructed by the target circuit.

In this case, it judges the change is one for lowering the current frequency.

The control means finds the power-supply voltage value to be supplied to the target circuit from the instructed frequency value and, for example, sets a time to lower the frequency in the timer. When it detects a coincidence signal from the timer, it judges that the time has become the specified one and instructs the clock supply circuit by the first control signal to lower the frequency to the specified one and instructs the power-supply voltage supply circuit by the second signal to lower the power-supply voltage value to the obtained one.

As a result, the clock supply circuit switches the clock frequency and supplies a system clock lowered in frequency to the target circuit.

Further, the power-supply voltage supply circuit switches the power-supply voltage and supplies it to the target circuit.

When raising the system clock frequency at a predetermined time, the target circuit supplies a frequency change instruction including time information to the control means.

When the control means receives a frequency change instruction from the target circuit, it judges whether to perform an operation for increasing (raising) the frequency or an operation for decreasing (lowering) the frequency from the frequency instructed by the target circuit.

In this case, it judges that the change is one for raising the current frequency.

When raising the frequency, the control means has to raise the power-supply voltage before changing the frequency.

Thus, the control means obtains the power-supply voltage value to be supplied to the target circuit from the instructed frequency value, calculates the time to heighten (raise) the power-supply voltage from the time instructed by the target circuit, and sets this in the timer.

Then, when detecting a coincidence signal from the timer, it judges that the time has become the specified one and instructs the power-supply voltage supply circuit by the second signal to raise the power-supply voltage value to the obtained one.

Next, the control means sets the time to raise the frequency in the timer. Then, when detecting a coincidence signal from the timer, it judges that the time has become the specified one and instructs the clock supply circuit by the first control signal to raise the frequency to the instructed one.

As a result, the clock supply circuit switches the clock frequency and supplies a system clock raised in frequency to the target circuit.

Further, the power-supply voltage supply circuit switches the power-supply voltage and supplies it to the target circuit.

Also, according to the present invention, for example, when raising the frequency of the system clock to be supplied to the target circuit at a predetermined time, when the control means receives a frequency change instruction, it judges whether to perform an operation for increasing (raising) the frequency or an operation for decreasing (lowering) the frequency.

In this case, it judges that the change is one for raising the current frequency.

The control means instructs the clock pulse generation circuit by the control signal to raise the frequency of the clock for a frequency-voltage conversion circuit at an earlier time than a predetermined time.

As a result, the clock pulse generation circuit raises the clock frequency for the frequency-voltage conversion circuit.

Note that, at this time, for example, the control means set the time needed to raise the power-supply voltage by the frequency in the timer.

The frequency-voltage conversion circuit instructs the power-supply voltage generation circuit by a voltage instruction signal to raise the voltage since the power-supply voltage relative to the frequency is low.

Due to this, the power-supply voltage supplied to the target circuit and the frequency-voltage conversion circuit is converged to the power-supply voltage required for the frequency.

When the control means detects a coincidence signal from the timer, it instructs the clock pulse generation circuit by a control signal to raise the frequency of the system clock for the target circuit.

The clock pulse generation circuit receiving the instruction from the control means at a predetermined time raises the frequency of the system clock for the target circuit.

In this case, the power-supply voltage supplied to the target circuit changes to a high value, however since the target circuit operates in synchronization with the clock of the frequency and has a higher power-supply voltage than a required minimum power-supply voltage for the frequency, the operation thereof is assured.

When lowering the frequency of the system clock to be supplied to the target circuit at a predetermined time, the control means judges that the change is one for lowering the frequency.

Thus, the control means instructs the clock pulse generation circuit by a control signal to lower the frequency of the system clock to be supplied to the target circuit.

As a result, the clock pulse generation circuit lowers the frequency of the system clock for the target circuit.

Next, the control means instructs the clock pulse generation circuit by a control signal to lower the frequency of the clock for the frequency-voltage conversion circuit.

Consequently, the clock pulse generation circuit lowers the frequency of the clock for the frequency-voltage conversion circuit.

Note that if the clock pulse generation circuit is capable of switching the system clock to be supplied to the target circuit and the clock supplied to the frequency-voltage conversion circuit simultaneously, the two may be switched simultaneously.

BRIEF DESCRIPTION OF THE DRAWINGS

These and other objects and features of the present invention will become clearer from the following description of the preferred embodiments given with reference to the attached drawings, in which:

FIG. 4 is a view of an example of a relationship of a clock frequency and a power-supply voltage in the present embodiment;

FIG. 6 is a flow chart for explaining a control operation for changing a clock frequency and a power-supply voltage of a control circuit in the first embodiment;

FIG. 17 is a flow chart for explaining a control operation for changing a clock frequency and a power-supply voltage of a frequency control circuit in the fifth embodiment; and FIGS. 18A to 18C are views for explaining disadvantages of the related art.

DESCRIPTION OF THE PREFERRED EMBODIMENTS

First Embodiment

Figure 1:
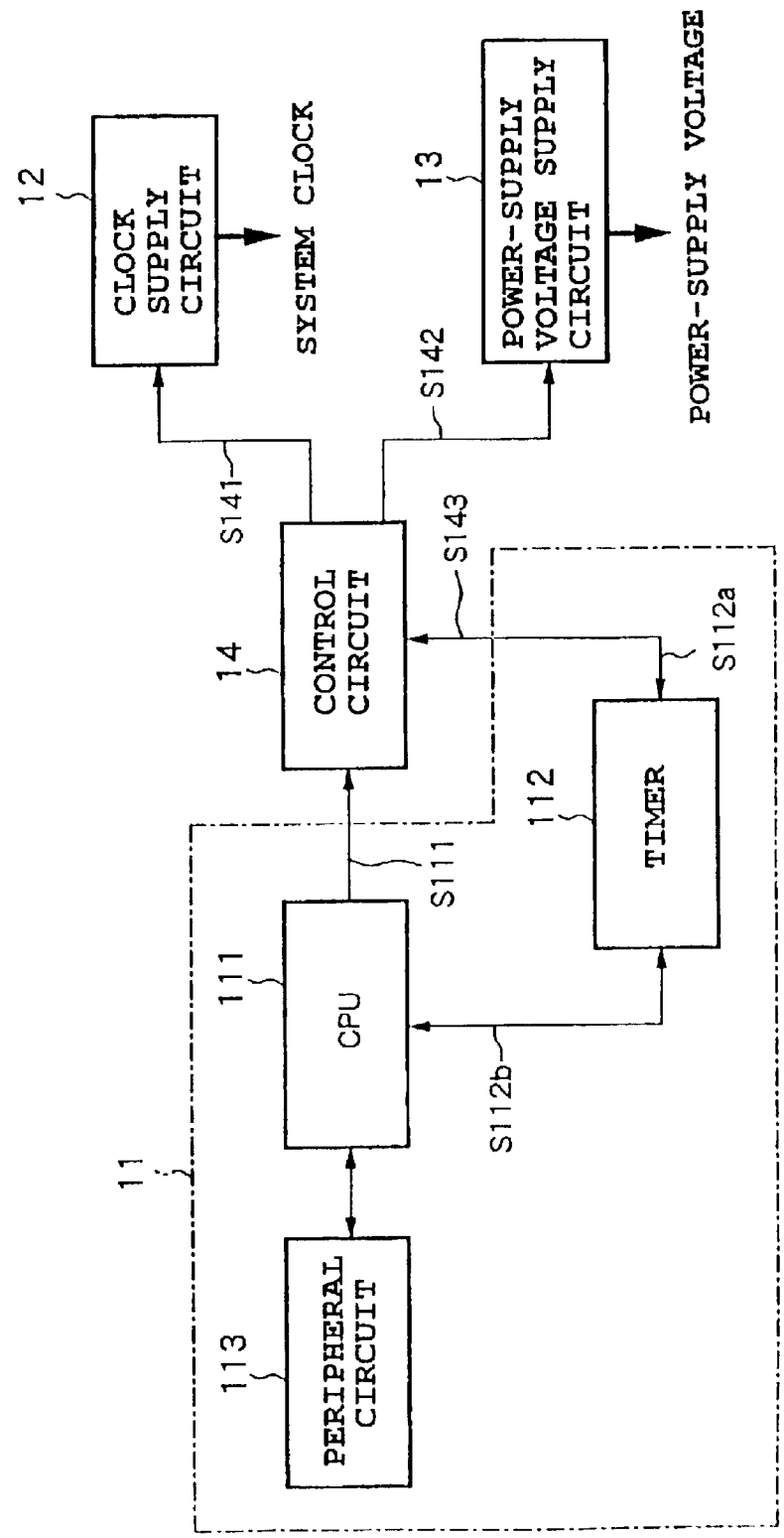
FIG. 1 is a block diagram of a first embodiment of an electronic circuit system employing a power-supply voltage frequency control circuit according to the present invention.

FIG. 1 is a block diagram of a first embodiment of an electronic circuit system employing a power-supply voltage frequency control circuit according to the present invention.

The present circuit system 10 comprises, as shown in FIG. 1, a target circuit 11, a clock supply circuit 12, a power-supply voltage supply circuit 13, and a control circuit 14.

The target circuit 11 forms a system to be controlled by a clock frequency and a power-supply voltage $V_{DD}$. As will be explained later on, it is supplied with a power-supply voltage $V_{DD}$ from the power-supply voltage supply circuit 13 capable of supplying a minimum power-supply voltage for assuring operation of the system at the clock frequency, operates in synchronization with a system clock SYSCLK supplied from the clock supply circuit 12 capable of generating a multiple levels of clock frequency, and performs the desired processing.

The target circuit 11 according to the first embodiment processes required tasks while working with CPU 111, a timer 112, and another peripheral circuit 113.

The CPU 111 receives a clocked time of the timer 112 and instructs the control circuit 14 at any time with the changed value of the frequency and time for changing the frequency as a signal S111. Namely, the CPU 111 only instructs the changed value of the frequency and does not consider the power-supply voltage.

The timer 112 clocks a certain time by operating in synchronization with a clock FXCLK having a fixed frequency and outputs the clocked result to the control circuit 14 as a coincidence signal S112a. Also, the timer 112 notifies the CPU 111 of the clocked time as a signal S112b.

Figure 2:
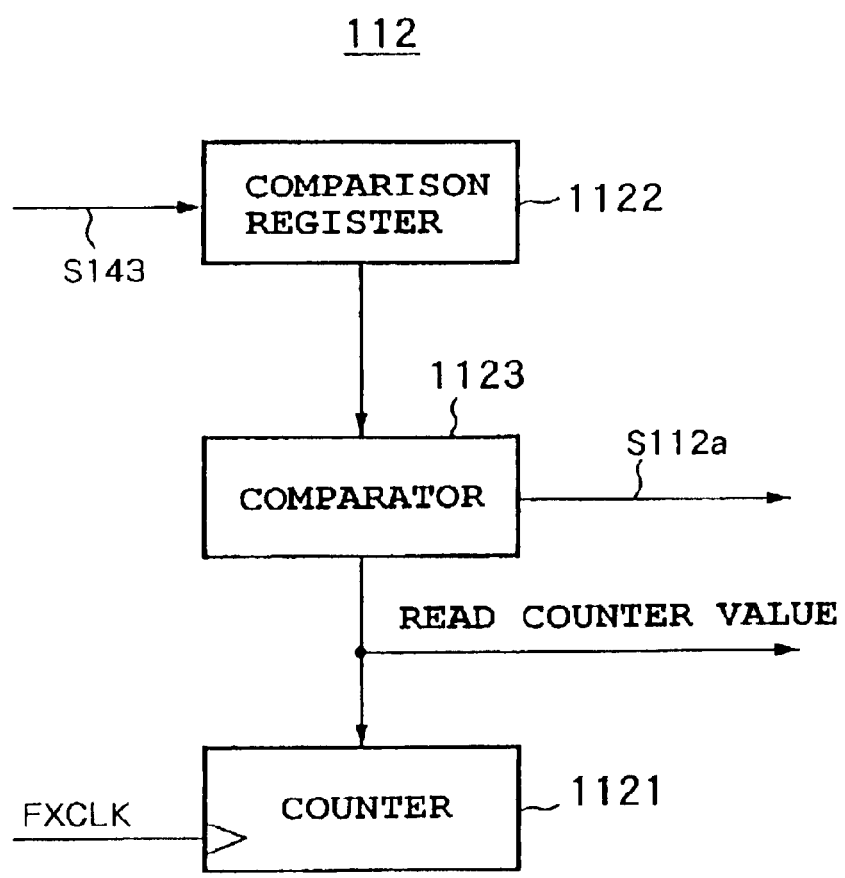
FIG. 2 is a view of a specific example of the configuration of a timer according to the first embodiment.

FIG. 2 is a view of a specific example of the configuration of the timer in FIG. 1.

The timer 112 comprises, as shown in FIG. 2, a counter 1121 operating in synchronization with the clock FXCLK, a comparison register 1122 for holding a comparison value VCMP to be compared with a count value VCNT of the counter 112 and a comparator 1123 for comparing the count value VCNT of the counter 1121 with the comparison value VCMP held in the comparison register 1122.

The timer 112 is set with the comparison value VCMP held in the comparison register 1122 as a signal S143 by the control circuit 14. When the count value VCNT of the counter 1121 matches the comparison value VCMP, the coincidence signal S112a notifying this match is output from the comparator 1123 to the control circuit 14.

The control circuit 14 is capable of determining the elapse of time by detecting the coincidence signal S112a.

The value of the counter 1121 can be read by both the CPU 111 and the control circuit 14. The CPU 111 and the control circuit 14 set in the comparison register 1122 a time obtained by adding a necessary elapse of time to the read value of the counter 1121.

The clock supply circuit 12 is capable of generating a system clock SYSCLK of a multiple levels of clock frequency and supplies to the target circuit 11 a system clock SYSCLK having a clock frequency instructed by a first control signal S141 from the control circuit 14.

Figure 3:
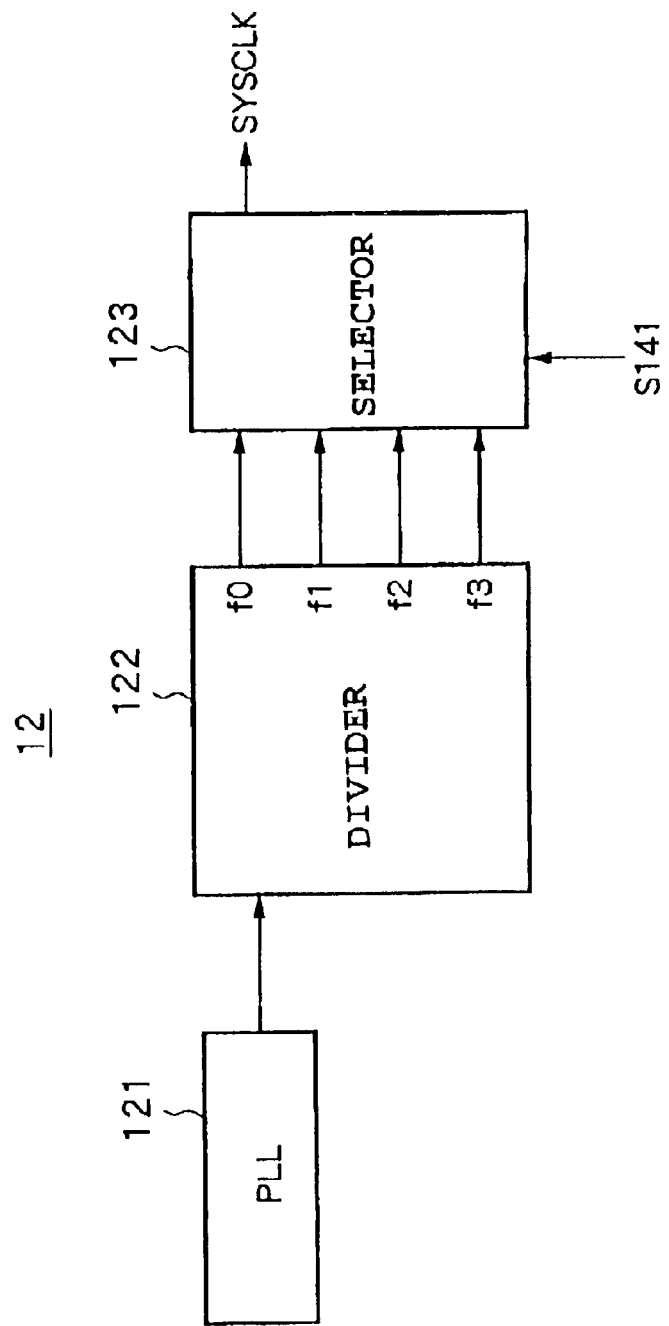
FIG. 3 is a view of a specific example of the configuration of a clock supply circuit according to the first embodiment.

FIG. 3 is a view of a specific example of the configuration of a clock supply circuit in FIG. 1.

The clock supply circuit 12 comprises, as shown in FIG. 3, a phase locked loop circuit (PLL circuit) 121 for generating a clock of a predetermined frequency, a divider 122 for generating clocks of a plurality of, for example, four kinds of clock frequencies f0, f1, f2, and, f3 by a plurality of division ratios, and a selector 123 for selecting and outputting a system clock having a clock frequency instructed by the first control signal S141 by the control circuit 14.

The clock supply circuit 12 supplies an oscillation clock having a frequency of 300 MHz of the PLL circuit 121 to the divider 122.

The divider 122 divides the oscillation clock of the PLL circuit 121 by a plurality of division ratios, such as 1/3, 1/4, 1/6, and 1/16, to supply clocks having a clock frequency of, for example, f0 (=100 MHz), f1 (=75 MHz), f2 (=50 MHz), and f3 (=25 MHz) to the selector 123.

The selector 123 selects a clock having the desired frequency in accordance with the first control signal S141 from the control circuit 14 and supplies it as a system clock SYSCLK to the target circuit 11.

The power-supply voltage supply circuit 13 can supply multiple levels of power-supply voltage $V_{DD}$ and supplies a power-supply voltage $V_{DD}$ having a value in accordance with a second control signal S142 of the control circuit 14 to the target circuit 11.

When the control circuit 14 receives a frequency change instruction signal S111 including time information from the CPU 111 of the target circuit 11, it judges whether to perform an operation for increasing (raising) the frequency or an operation for decreasing (lowering) it from the frequency instructed by the CPU 111. When judging to raise the frequency, it obtains the power-supply voltage value to be supplied to the target circuit from the instructed frequency value, calculates the time to raise the voltage-source voltage $V_{DD}$ from the time instructed by the CPU 111, sets the calculated time in the comparison register 1122 of the timer 112, instructs the power-supply voltage supply circuit 13 by the second control signal S142 to raise the power-supply voltage to the obtained one when detecting a coincidence signal S112a from the timer, then sets the time to raise the frequency in the comparison register 1122 of the timer 112, and instructs the clock supply circuit 12 by the first control signal S141 to raise the frequency to the instructed one when detecting a coincidence signal S112a from the timer.

When judging to perform an operation for lowering frequency, the control circuit 14 obtains the power-supply voltage to be supplied to the target circuit 11 from the instructed frequency value, sets the time to lower the frequency in the comparison register 1122 of the timer 112, instructs the clock supply circuit 12 by the first control signal S141 to lower the frequency to the instructed one when detecting a coincidence signal S112a from the timer, and instructs the power-supply voltage supply circuit 13 by the second control signal S142 to lower the power-supply voltage value to the obtained one.

As explained above, the control circuit 14 instructs the necessary power-supply voltage in accordance with the clock frequency. As a result, the CPU 111 only has to instruct the changed value of the frequency and the time and does not need to consider the power-supply voltage.

The control circuit 14 calculates the necessary power-supply voltage from the value of the clock frequency by, for example as shown in FIG. 4, the method of internally holding a table of the relationship of values of power-supply voltage capable of assuring operation of the system at clock frequencies able to be generated by the clock supply circuits 12.

In the example in FIG. 4, it is determined in advance that the power-supply voltage $V_{DD}$ is V0 at the time of a frequency f0, the power-supply voltage $V_{DD}$ is V1 at the time of a frequency f1, the power-supply voltage $V_{DD}$ is V2 at the time of a frequency f2, and the power-supply voltage $V_{DD}$ is V3 at the time of a frequency f3. Note that the relationships of f0>f1>f2>f3 and V0>V1>V2>V3 are satisfied.

Alternatively, the control circuit 14 adopts the method of providing a frequency-voltage conversion circuit having the function of receiving a clock as an input and outputting a power-supply voltage or a power-supply voltage setting value in accordance with the clock frequency etc.

Further, since the control circuit 14 requires a certain period of time when changing the power-supply voltage, it has to control the power-supply voltage in advance in some cases. By holding the necessary times in the internal register, it can automatically calculate the time of change of the power-supply voltage from the time of change of the frequency.

Also, the control circuit 14 considers a setup time needed for the power-supply voltage supply circuit 13 to change the power-supply voltage. When changing from a low frequency to a high frequency, it instructs the power-supply voltage supply circuit 13 by the second control signal S142 to raise the power-supply voltage to one in accordance with the high frequency at a time earlier by exactly the setup time from the timing of switching the frequency.

When switching from a high frequency to a low frequency, it instructs the power-supply voltage supply circuit 13 by the second control signal S142 to lower the power-supply voltage to one in accordance with the low frequency matched with that timing.

By controlling the power-supply voltage by the timing, the operation of the system can be assured even if the frequency is switched.

The control circuit 14 can be controlled at an appropriate timing by clocking time by using the timer 112.

Figures 5A, 5B:
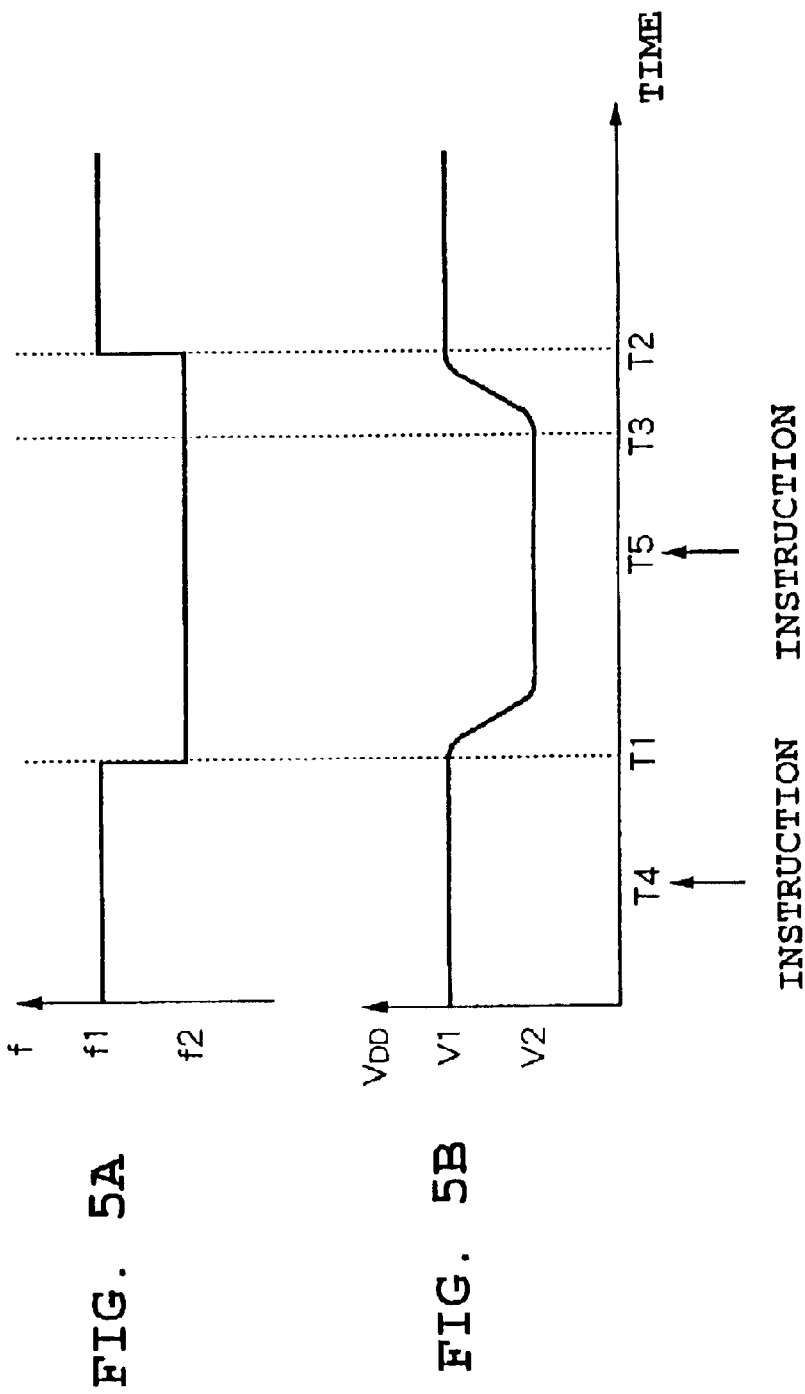
FIGS. 5A and 5B are timing charts for explaining a control operation for changing a clock frequency and a power-supply voltage of a control circuit in the first embodiment.

FIGS. 5A and 5B are timing charts for explaining a control operation for changing the clock frequency and a power-supply voltage of the control circuit in the first embodiment. FIG. 6 is a flow chart for explaining a control operation for changing the clock frequency and power-supply voltage of the control circuit in the first embodiment.

Below, the operation by the above configuration will be explained with reference to the timing charts in FIGS. 5A and 5B and the flow chart in FIG. 6 focusing on the control functions of the control circuit 14.

As shown in FIG. 5A and FIG. 5B, when lowering the system clock frequency f from f1 to f2 at a time T1, the CPU 111 of the target circuit 11 outputs a frequency change instruction signal S111 including time information instructing the change of the frequency to f2 at the time T1 to the control circuit 14 at a time T4 earlier than the time T1.

When the control circuit 14 receives the frequency change instruction signal S111 from the CPU 111 of the target circuit 11, it judges whether to perform an operation for raising the frequency or an operation for lowering the frequency from the frequency instructed by the CPU 111 (ST1 in FIG. 6).

In this case, it judges that the change is one for lowering the current frequency f1 to f2.

The control circuit 14 obtains the power-supply voltage value to be supplied to the target circuit 11 from the instructed frequency value and sets the time for lowering the frequency in the comparison register 1122 of the timer 112. Then, when it detects a coincidence signal S112a from the timer 112 (ST2 in FIG. 6), it considers that the specified time T1 has come, instructs the clock supply circuit 12 by the control signal S141 to lower the frequency to the instructed one (ST3 in FIG. 6), and instructs the power-supply voltage supply circuit 13 by the second control signal S142 to lower the power-supply voltage value to the obtained one (ST4 in FIG. 6).

As a result, the clock supply circuit 12 switches the clock frequency f from f1 to f2 and supplies a system clock SYSCLK having a frequency of f2 to the target circuit 11.

Also, the power-supply voltage supply circuit 13 switches the power-supply voltage $V_{DD}$ from V1 to V2 and supplies it to the target circuit 11.

As shown in FIG. 5A and FIG. 5B, when raising the system clock frequency f from f2 to f1 at a time T2, the CPU 111 outputs a frequency change instruction signal S111 including time information to the control circuit 14 to instruct it to change the frequency to f1 at a time T5 earlier than the time T2.

When the control circuit 14 receives the frequency change instruction signal S111 from the CPU 111 of the target circuit 11, it judges whether to perform an operation for raising the frequency or an operation for lowering the frequency from the frequency instructed from the CPU 111 (ST1 in FIG. 6).

In this case, it judges the change to be one for raising the current frequency f2 to f1.

When raising the frequency, the control circuit 14 has to raise the power-supply voltage before changing the frequency.

Thus, the control circuit 14 obtains the power-supply voltage to be supplied to the target circuit 11 from the instructed frequency value, calculates the time T3 for raising the power-supply voltage $V_{DD}$ from the time T5 instructed by the CPU 111 (ST5 in FIG. 6), and sets the calculated time in the comparison register 1122 of the timer 112.

When detecting a coincidence signal S112a from the timer 112, it considers that a specified time T1 has come (ST6 in FIG. 6) and instructs the power-supply voltage supply circuit 13 by the second control signal S142 to raise the power-supply voltage to the obtained one (ST7 in FIG. 6).

Next, it sets the time T2 for raising the frequency in the comparison register 1122 of the timer 112. When detecting a coincidence signal S112a from the timer 112, it considers that a specified time T2 has come (ST8 in FIG. 6) and instructs the clock supply circuit 12 by the first control signal S141 to raise the frequency to the instructed one (ST9 in FIG. 6).

As a result, the clock supply circuit 12 switches the clock frequency f from f2 to f1 and supplies a system clock SYSCLK of the frequency f1 to the target circuit 11.

Also, the power-supply voltage supply circuit 13 switches the power-supply voltage $V_{DD}$ from V2 to V1 and supplies it to the target circuit.

Note that the time T4 and time T5 to send an instruction for changing the frequency from the CPU 111 may be any time as long as they are earlier than the time when the power-supply voltage $V_{DD}$ and the clock frequency f are changed.

Accordingly, it is sufficient to send an instruction at any time in the scheduling of tasks to be processed, so that no suspension of the tasks occurs.

In a normal system, time management differs depending on its operating system and applications. Some systems manage processing of tasks by absolute time, while other systems perform processing sequentially and manage processing of tasks by relative time.

Note that since the control circuit 14 is capable of reading a value of the counter 1121 of the timer 112, the frequency change times T1 and T2 may be specified by absolute time managed by the timer 112 or by relative time to the times T4 and T5 instructed from the CPU 111. When instructing the control time by absolute time, the time is set in the comparison register 1122 of the timer 112. When controlling the control time by relative time, a current time is read and a specific time is added thereto to be set in the comparison register 1122.

As explained above, according to the first embodiment, since there are provided a clock supply circuit 12 able to supply a system clock of a plurality of clock frequencies and supplying a system clock having a clock frequency in accordance with a first control signal S151 to a target circuit for performing processing in synchronization with the system clock, a power-supply voltage supply circuit 13 for supplying a power-supply voltage in accordance with a second control signal S152 to the target circuit 11, a control circuit 14 for, when receiving an instruction for changing a frequency from a CPU 111 of the target circuit 11, judging whether the change is for raising the frequency or not from the frequency change value, outputting a second control signal S142 to raise the power-supply voltage at a time earlier than an instructed time and outputting a first control signal to raise the system clock frequency to an instructed frequency value at the instructed time when the change is to raise the frequency, while outputting a first control signal S141 to lower the system clock frequency to the instructed frequency at an instructed time and outputting a second control signal S142 to lower the power-supply voltage when the change is to lower the frequency, the following effects can be obtained.

Namely, it is not necessary for a CPU or other circuit for controlling the target circuit 11 (system) to control the system while managing time, no interruption processing etc. occurs, and a load on the system side is reduced.

Also, it is sufficient for the system side to consider only control of the frequency. There is no load for controlling the power-supply voltage.

The system side is capable of giving an instruction for change at any time and has the advantages that processing may be performed while not occupied by normal processing and the load is small in scheduling.

Also, according to the present embodiment, the control circuit 14 considers a setup time required by the power-supply voltage supply circuit 13 to change the power-supply voltage. When switching from a low frequency to a high frequency, it instructs the power-supply voltage supply circuit 13 by a second control signal S142 to raise the power-supply voltage to one in accordance with the high frequency at a time earlier from the timing of switching exactly by the setup time, while when switching from a high frequency to a low frequency, instructs the power-supply voltage supply circuit 13 by a second control signal S142 to lower the power-supply voltage to one in accordance with the low frequency in accordance with the timing of the switching, and controls the power-supply voltage by the timing, so the operation of the system can be assured even when the frequency is switched.

The control circuit 14 is capable of controlling the power-supply voltage at an appropriate timing by counting a time by using the timer 112.

Second Embodiment

Figure 7:
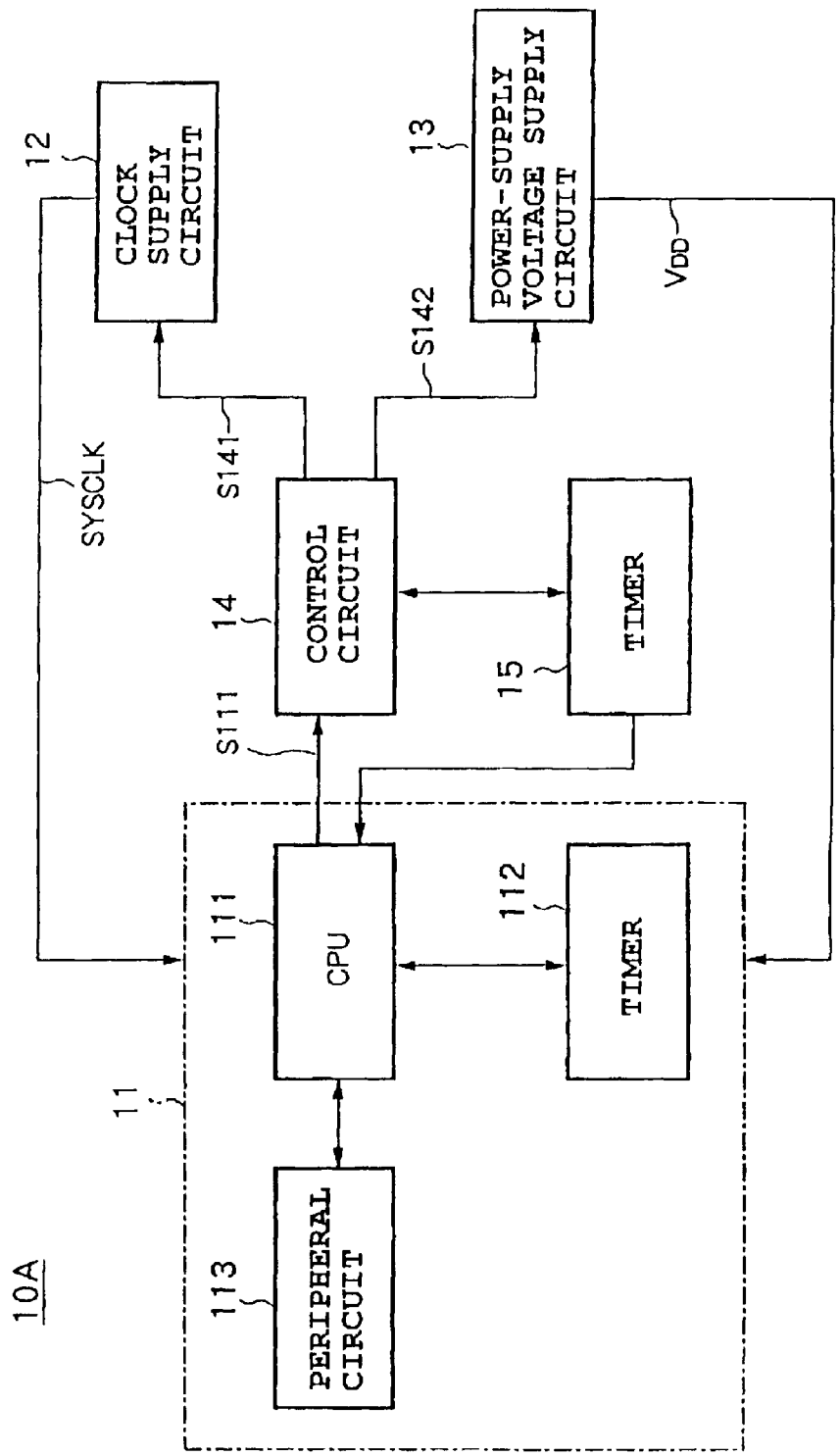
FIG. 7 is a block diagram of a second embodiment of an electronic circuit system employing a power-supply voltage frequency control circuit according to the present invention.

FIG. 7 is a block diagram of a second embodiment of an electronic circuit system employing a power-supply frequency control circuit according to the present invention.

The present second embodiment is different from the first embodiment in that it is controlled by a control circuit 14 separate from a timer 112 communicating with a CPU 111 of the target circuit 11 and a timer 15 whose count the CPU 111 can read is independently arranged.

In the configuration of FIG. 1, modification is necessary to add to the timer 112 performing processing on a predetermined task related to the CPU 111 a comparator and a comparison register for the control circuit 14. However, if the circuit of the present invention is added to an existing system, modification of the timer is difficult in some cases. Also, depending on the task to be processed by the system, there are probably some cases where the timer has to be exclusively used.

In such a case, by separately arranging in addition to the timer 112 communicating with the CPU 111 a timer 15 controlled by the control circuit 14 and with a count able to be read by the CPU 111 as in the configuration shown in FIG. 7 according to the second embodiment, the same effects as in the above first embodiment can be obtained. Moreover, there is an advantage of being able to easily and flexibly deal with existing systems.

Third Embodiment

Figure 8:
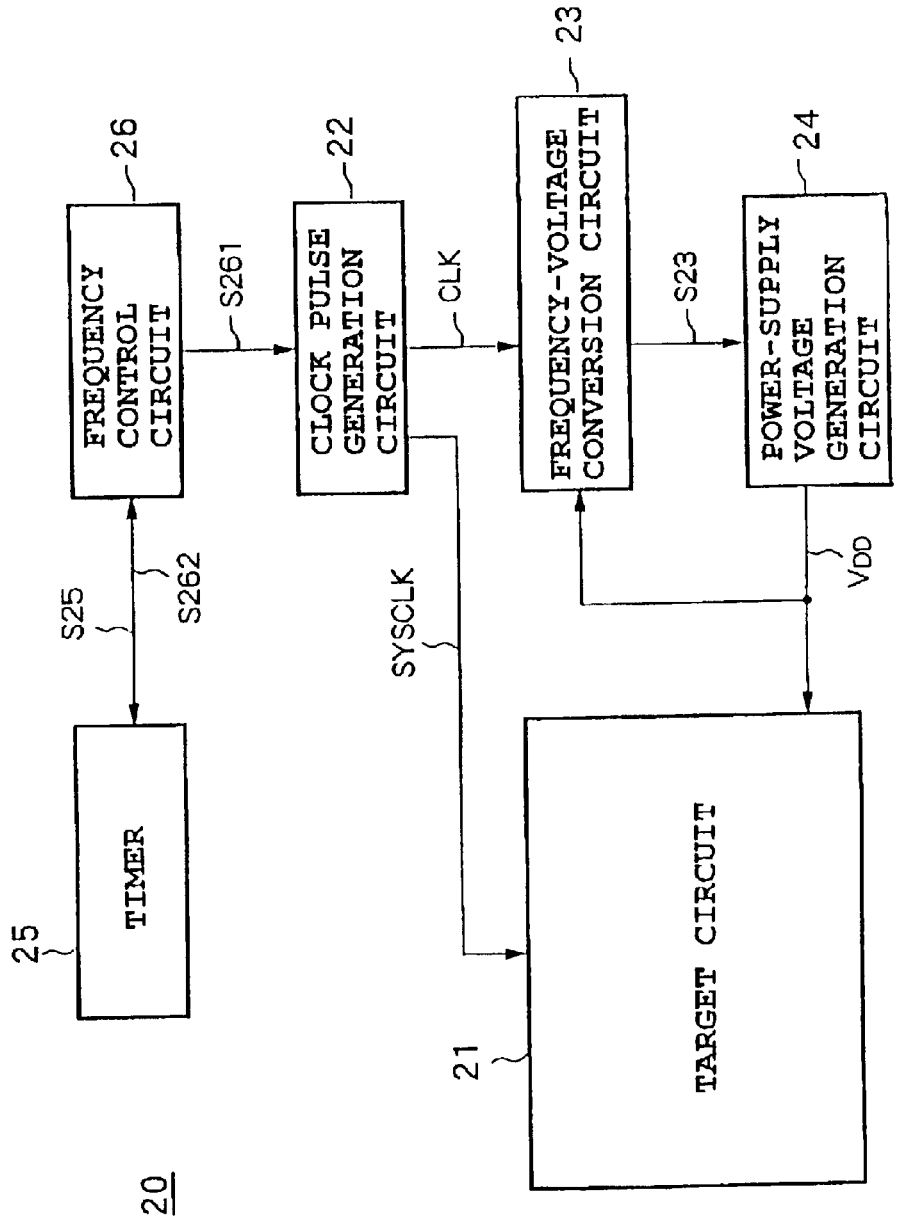
FIG. 8 is a block diagram of a third embodiment of an electronic circuit system employing a power-supply voltage frequency control circuit according to the present invention.

FIG. 8 is a block diagram of a third embodiment of an electronic circuit system employing a power-supply voltage frequency control circuit according to the present invention.

The circuit system 20 comprises, as shown in FIG. 8, a target circuit 21, a clock pulse generation circuit 22, a frequency-voltage conversion circuit 23, a power-supply voltage generation circuit 24, a timer 25, and a frequency control circuit 26.

The target circuit 21 forms a system to be controlled by a clock frequency and a power-supply voltage $V_{DD}$. As will be explained later on, it is supplied with a power-supply voltage $V_{DD}$ from the power-supply voltage generation circuit 24 capable of supplying the minimum power-supply voltage to assure the operation of the system at the clock frequency and operates in synchronization with a system clock SYSCLK supplied from the clock pulse generation circuit 22 capable of generating multiple levels of clock frequency to perform desired processing.

The clock pulse generation circuit 22 is capable of generating a clock having multiple levels of clock frequency, generates a system clock SYSCLK having a frequency separately instructed by the control signal S261 by the frequency control circuit 26, supplies the same to the target circuit 21 at an instructed timing, and supplies a clock CLK having a separately instructed frequency to the frequency-voltage conversion circuit 23 at an instructed timing.

Note that the clock pulse generation circuit 22 also supplies to the frequency-voltage conversion circuit 23 a clock CLK having the same frequency as the system clock SYSCLK so as to determine the necessary minimum power-supply voltage to be supplied to the target circuit 21.

Figure 9:
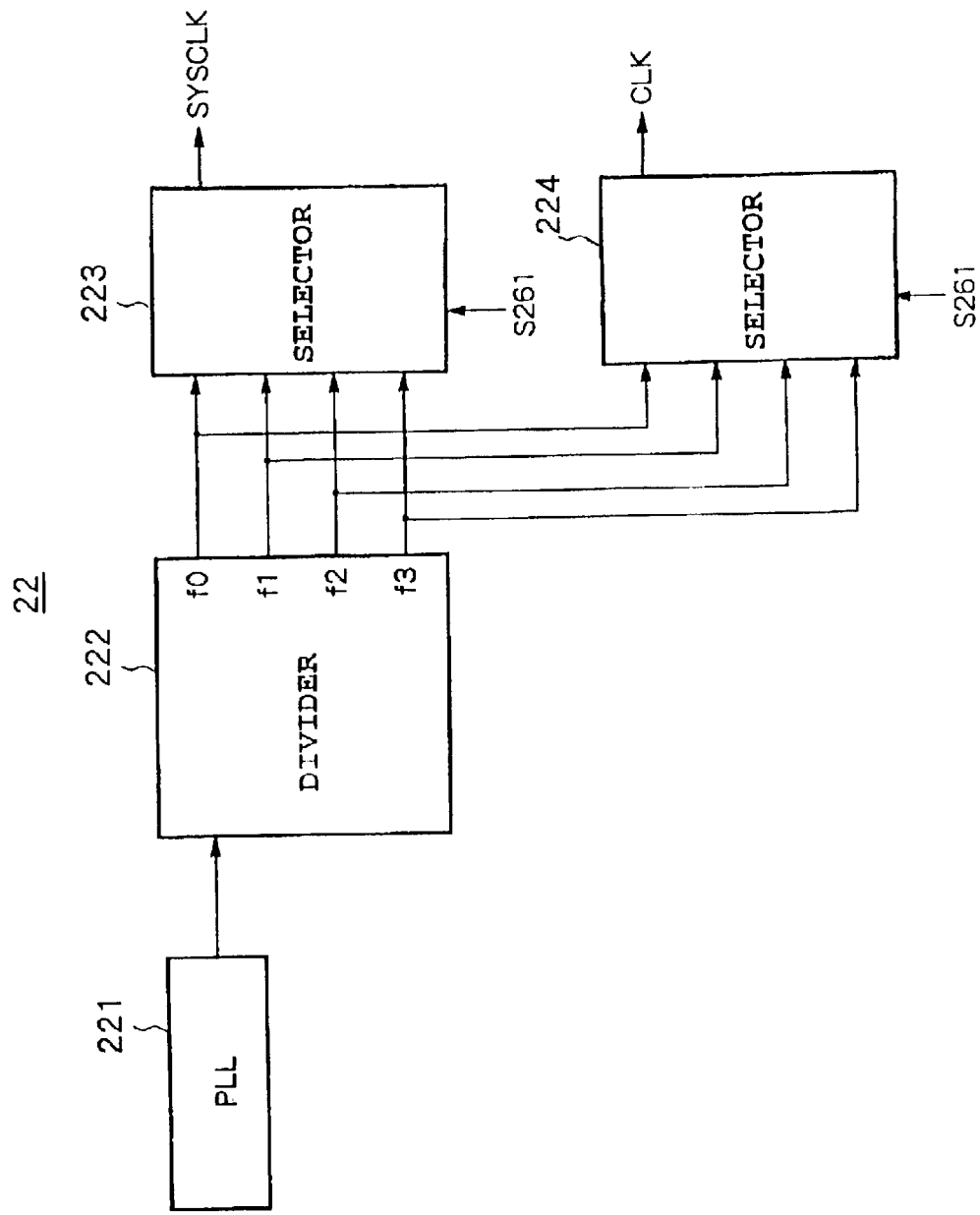
FIG. 9 is a view of a specific example of the configuration of a clock pulse generation circuit according to the third embodiment.

FIG. 9 is a view of a specific example of the configuration of a clock pulse generation circuit in FIG. 8.

The clock pulse generation circuit 22 comprises, as shown in FIG. 9, a phase-locked loop circuit (PLL circuit) 221 for generating a clock having a predetermined frequency, a divider 222 for generating a plurality of, for example, four kinds of clock frequencies f0, f1, f2, and f3 by a plurality of division ratios, a selector 223 for selecting a system clock SYSCLK having a clock frequency instructed by the control signal S261 from the frequency control circuit 26 and outputting it to the target circuit 21, and a selector 224 for selecting a clock CLK having a clock frequency instructed by the control signal S261 from the frequency control circuit 26 and outputting it to the frequency-voltage conversion circuit 23.

When receiving an instruction to raise the system clock SYSCLK by the control signal S261 of the frequency control circuit 26, the clock pulse generation circuit 22 selects a clock CLK having a specified frequency of, for example, f1 by the selector 224 and outputs it to the frequency-voltage conversion circuit 23, then, after a sufficient time for raising the power-supply voltage $V_{DD}$ to V1 by which operation at the frequency f1 can be assured has passed, selects a clock CLK having a specified frequency of f1 by the selector 223 and supplies it as the system clock SYSCLK to the target circuit 21.

When receiving an instruction to lower the system clock SYSCLK by the control signal S261 of the frequency control circuit 26, the clock pulse generation circuit 22 selects a clock having a specified frequency of, for example, f2 by the selector 223 and supplies it as a system clock SYSCLK to the target circuit 21, then selects a clock having a specified frequency of f2 by the selector 224 and supplies it as a clock CLK to the frequency-voltage conversion circuit 23.

Alternately, when receiving an instruction to lower the system clock SYSCLK by the control signal S261 of the frequency control circuit 26, the clock pulse generation circuit 22 selects a clock having a specified frequency of, for example, f2 by the selector 223 and supplies it as the system clock SYSCLK to the target circuit 21, while it selects a clock having a specified frequency of f2 by the selector 224 and supplies it as a clock CLK to the frequency-voltage conversion circuit 23.

The clock pulse generation circuit 22 supplies an oscillation clock having a frequency of, for example, 300 MHz of the PLL circuit 221 to the divider 222.

The divider 222 divides the generated clock of the PLL circuit 221 by a plurality of division ratios of, for example, 1/3, 1/4, 1/6, and 1/12 to generate clocks having a clock frequency of, for example, f0 (=100 MHz), f1 (=75 MHz), f2 (=50 MHz), and f3 (=25 MHz) and supplies them to the selector 223 and the selector 224.

Then, the selector 223 selects a clock having a desired frequency at a specified timing in accordance with the control signal S261 from the frequency control circuit 26 and supplies it as a system clock SYSCLK to the target circuit 11.

The selector 224 selects a clock having a desired frequency at a specified timing in accordance with the control signal S261 from the frequency control circuit 26 and supplies it as a clock CLK to the frequency-voltage conversion circuit 23.

The frequency-voltage conversion circuit 23 judges whether the power-supply voltage $V_{DD}$ supplied from the power-supply voltage generation circuit 24 is high or low relative to the frequency of the clock CLK supplied from the clock pulse generation circuit 22. When the power-supply voltage is high, it instructs the power-supply voltage generation circuit 24 to lower the power-supply voltage by a voltage instruction signal S23, while when the power-supply voltage is low, instructs the power-supply voltage generation circuit 24 to raise the power-supply voltage by the voltage instruction signal S23.

As the method of configuring such a frequency-voltage conversion circuit, the method of obtaining delay information by the method of extracting a critical path included in a target circuit, configuring a multistage delay element array, etc. is used.

Figure 10:
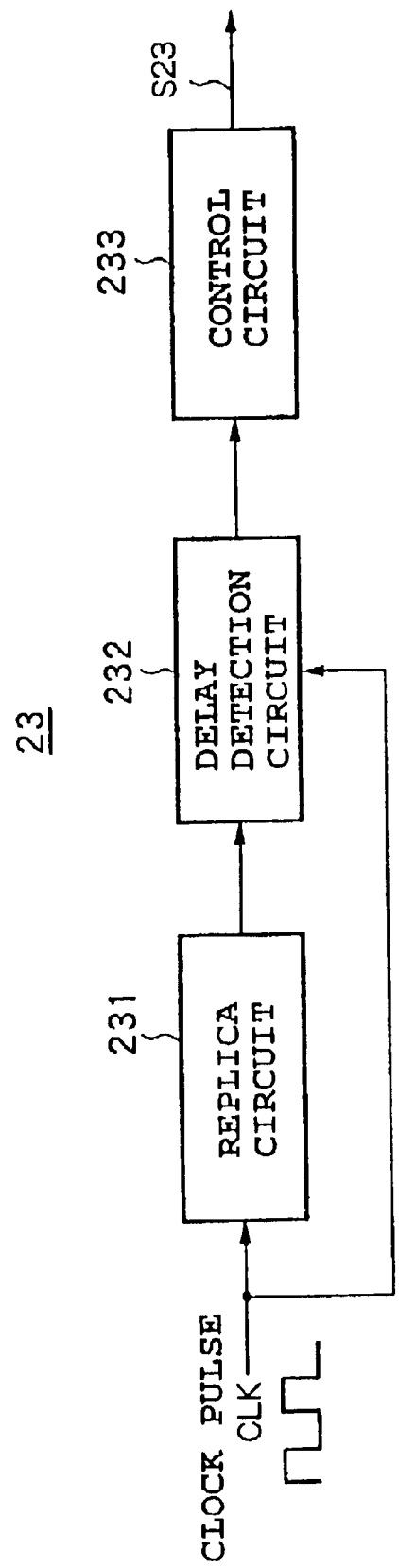
FIG. 10 is a view of a specific example of the configuration of a frequency-voltage conversion circuit according to the third embodiment.

FIG. 10 is a view of a specific example of the configuration of a frequency-voltage conversion circuit in FIG. 8.

The frequency-voltage conversion circuit 23 comprises, as shown in FIG. 10, a replica circuit 231, a delay detection circuit 232, and a control circuit 233.

In the frequency-voltage conversion circuit 23, the replica circuit 231 is configured to have a transfer path having the same transfer characteristics as those of a critical path of the target circuit 21.

Then, the clock pulse generation circuit 22 supplies its clock CLK to the replica circuit 231, and the delay detection circuit 232 detects a delay time of a signal propagated in the replica circuit 231.

The delay detection circuit 232 is capable of detecting a phase difference of a signal propagated in the replica circuit 231 and the clock CLK, that is, a delay time of the replica circuit per clock cycle by latching the signal propagated in the replica circuit 231 in the next cycle of the clock CLK.

The control circuit 233 instructs a voltage value to the power-supply voltage generation circuit 24 based on the delay information detected in the delay detection circuit 232.

When the delay time of the signal propagated in the replica circuit 231 is sufficiently shorter than one clock cycle, the power-supply voltage $V_{DD}$ can be lowered further. The control circuit 233 then instructs a lower power-supply voltage value than the current power-supply voltage $V_{DD}$ to the power-supply voltage generation circuit 24.

When the delay time of the signal propagated in the replica circuit 231 is longer than one clock cycle, the power-supply voltage $V_{DD}$ has to be raised more and the control circuit 233 instructs a higher power-supply voltage value than the current power-supply voltage $V_{DD}$ to the power-supply voltage generation circuit 24.

Due to the power-supply voltage $V_{DD}$ supplied from the power-supply voltage generation circuit 24, the delay characteristics of the replica circuit 231 change. The power-supply voltage $V_{DD}$ converges so that the delay time of the signal propagated from the replica circuit 231 becomes equal to one clock cycle.

Accordingly, by changing a frequency of the clock CLK to be supplied to the frequency-voltage conversion circuit 23, a power-supply voltage $V_{DD}$ by which a delay time of the signal propagated in the replica circuit 231 becomes equal to one clock cycle is supplied from the power-supply voltage generation circuit 24.

The power-supply voltage generation circuit 24 follows the instruction from the frequency-voltage conversion circuit 23 to raise or lower the power-supply voltage $V_{DD}$ and supplies the same to the target circuit 21 and the frequency-voltage conversion circuit 23.

The timer 25 clocks a certain time set by the frequency control circuit 26 by operating in synchronization with a fixed frequency clock FXCLK and outputs the clocked result as a coincidence signal S25 to the frequency control circuit 26.

Figure 11:
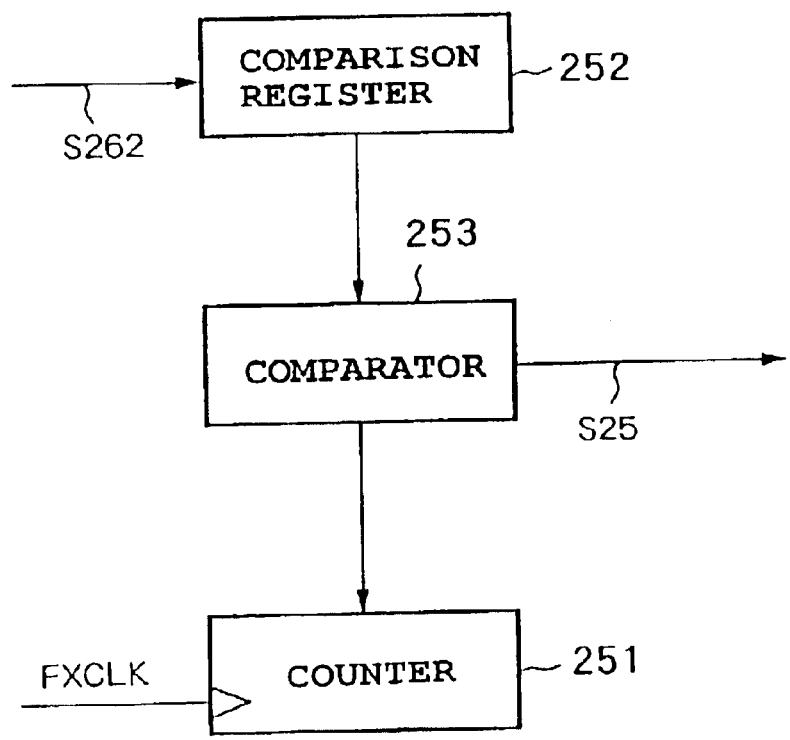
FIG. 11 is a view of a specific example of the configuration of a timer according to the third embodiment.

FIG. 11 is a view of a specific example of the configuration of the timer shown in FIG. 8.

The timer 25 comprises, as shown in FIG. 11, a counter 251 operating in synchronization with a clock FXCLK, a comparison register 252 for holding the comparison value VCMP to be compared with a count value VCNT of the counter 251, and a comparator 253 for comparing the count value VCNT with the comparison value VCMP held by the comparison register 252.

The timer 25 is set with the comparison value VCMP held in the comparison register 252 as a signal S252 by the frequency control circuit 26. When the count value VCNT matches the comparison value VCMP, it outputs a coincidence signal S25 for notifying the match from the comparator 253 to the frequency control circuit 26.

The frequency control circuit 26 is capable of determining the elapse of time by detecting the coincidence signal S25.

When receiving a frequency change instruction of the system clock SYSCLK for the target circuit 21 from a not shown control system, the frequency control circuit 26 judges whether to perform an operation for raising the frequency or an operation for lowering the frequency from the instructed frequency. When raising the frequency, the frequency control circuit 26 instructs the clock pulse generation circuit 22 by the control signal S261 to raise the frequency of the clock CLK to the frequency-voltage conversion circuit 23, sets in the comparison register 252 of the timer 25 a necessary time for raising the power-supply voltage $V_{DD}$ at that frequency, and instructs the clock pulse generation circuit 22 by the control signal S261 to raise the frequency of the system clock SYSCLK to the target circuit 21 when detecting a coincidence signal S25 from the timer 25.

Also, when it judges to perform an operation for lowering the frequency, the frequency control circuit 26 instructs the clock pulse generation circuit 22 by the control signal S261 to lower the frequency of the system clock SYSCLK to be supplied to the target circuit 21 and instructs the clock pulse generation circuit 22 by the control signal S261 to lower the frequency of the clock CLK for the frequency-voltage conversion circuit 23.

As explained above, the frequency control circuit 26 is capable of separately instructing the clock pulse generation circuit 22 with the system clock SYSCLK to be supplied to the target circuit 21 and with the frequency of the clock CLK to be supplied to the frequency-voltage conversion circuit 23.

Also, the frequency control circuit 26 is capable of counting an elapse of time by using the timer 25.

FIGS. 12A to 12E are timing charts for explaining a control operation of changing a clock frequency and a power-supply voltage of a control circuit in the third embodiment. FIG. 13 is a flow chart for explaining a control operation for changing a clock frequency and a power-supply voltage of a control circuit in the third embodiment.

Below, the operation of the above configuration will be explained with reference to the timing charts in FIGS. 12A to 12E and the flow chart in FIG. 13 focusing on control functions of the frequency control circuit 26.

Note that it is assumed that the minimum power-supply voltage by which an operation of the target circuit 21 can be assured at the clock frequency of f1 is V1, and the minimum power-supply voltage by which an operation of the target circuit can be assured at the clock frequency of f2 is V2. At this time, when f1>f2, V1>V2 stands.

Figure 12:
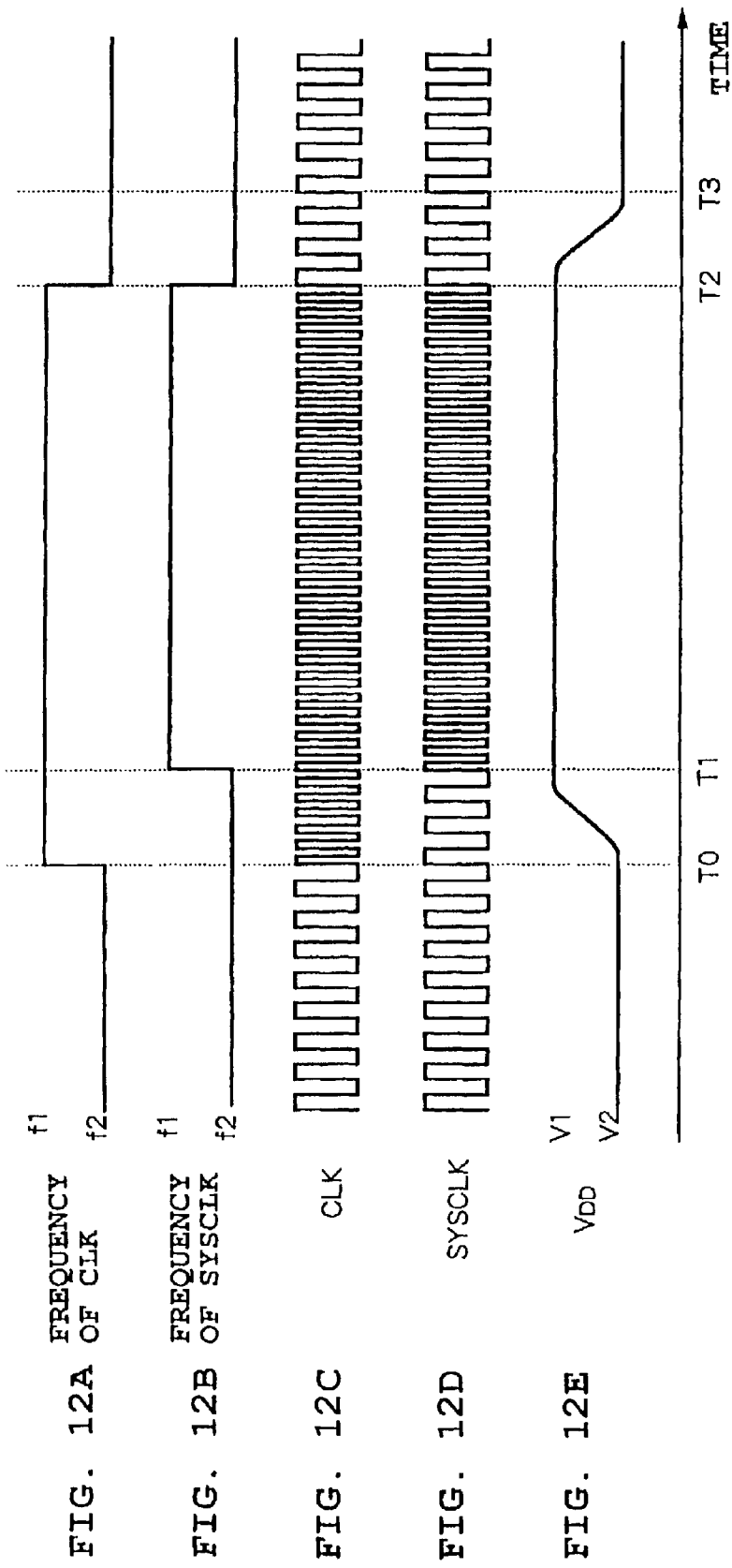
FIGS. 12A to 12E are timing charts for explaining a control operation for changing a clock frequency and a power-supply voltage of the control circuit in the third embodiment.
Figure 13:
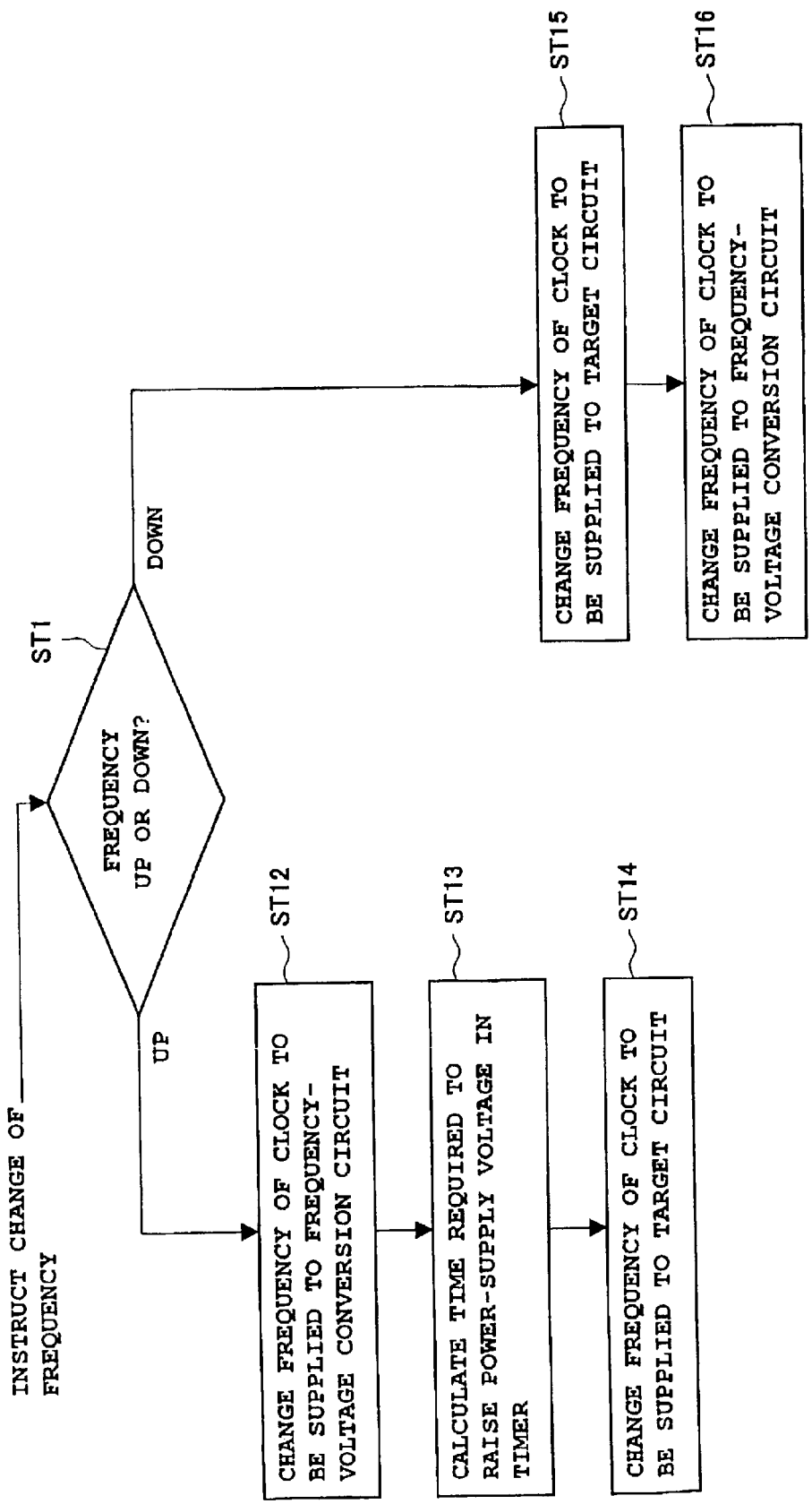
FIG. 13 is a flow chart for explaining a control operation for changing a clock frequency and a power-supply voltage of the control circuit in the third embodiment.

First, as shown in FIG. 12B, a case of raising the frequency of a system clock SYSCLK to be supplied to a target circuit 21 from f2 to f1 at a time T1 will be explained.

When the frequency control circuit 26 receives a frequency change instruction, it judges whether to perform an operation for raising or an operation for lowering the frequency (ST11 in FIG. 13).

In this case, it judges the change to be one for raising the frequency from f2 to f1.

The frequency control circuit 26, as shown in FIG. 12A, instructs the clock pulse generation circuit 22 by a control signal S261 to raise the frequency of the clock CLK for the frequency-voltage conversion circuit 23 at a time T0 earlier than the time T1.

Due to this, the clock pulse generation circuit 22, as shown in FIG. 12C, raises the frequency of the clock CLK for the frequency-voltage conversion circuit 23 from f2 to f1 (ST12 in FIG. 13).

Note that the time necessary to raise the power-supply voltage $V_{DD}$ at the frequency f1 is set in the comparison register 252 of the timer 25.

Since the power-supply voltage is low relative to the frequency f1, the frequency-voltage conversion circuit 23 instructs the power-supply voltage generation circuit 24 by a voltage instruction signal S23 to raise the voltage.

Due to this, the power-supply voltage $V_{DD}$ to be supplied to the target circuit 21 and the frequency-voltage conversion circuit 23 is converged to the power-supply voltage V1 necessary for the frequency f1.

Then, when detecting a coincidence signal S25 from the timer 25 (ST13 in FIG. 13), the frequency control circuit 26 instructs the clock pulse generation circuit 22 by the control signal S261 to raise the frequency of the system clock SYSCLK for the target circuit 21.

Then, as shown in FIG. 12B and FIG. 12D, the clock pulse generation circuit 22 receiving the instruction from the frequency control circuit 26 at the time T1 raises the frequency of the system clock SYSCLK for the target circuit 21 from f2 to f1 (ST14 in FIG. 13).

In this case, as shown in FIG. 12E, the power-supply voltage $V_{DD}$ supplied to the target circuit 21 changes from V2 to V1 during the time from T0 to T1, but the target circuit 21 operates in synchronization with the clock having a frequency of f2 and has a higher power-supply voltage than the minimum required power-supply voltage V2 at the frequency of f2, thus the operation is assured.

The time necessary for the power-supply voltage $V_{DD}$ to change from V2 to V1 can be calculated from the timing for instruction from the frequency-voltage conversion circuit 23 to the power-supply voltage generation circuit 24, the ability of the power-supply voltage generation circuit 24 to supply a power-supply voltage, and the time of change of the power-supply voltage, so the frequency control circuit 26 is capable of counting a time calculated in advance by the timer 25.

Accordingly, the frequency control circuit 26 instructs the clock pulse generation circuit 22 to raise the clock frequency for the frequency-voltage conversion circuit 23 from f2 to f1 at a time T0 as explained above, detects an elapse of time calculated in advance by the timer 25, then instructs the clock pulse generation circuit 22 to raise the frequency of the system clock SYSCLK to be supplied to the target circuit 21, whereby the desired operation is realized.

Next, as shown in FIG. 12B, a case of lowering the frequency of the system clock SYSCLK supplied to the target circuit 21 from f1 to f2 at a time T2 will be explained.

In this case, the frequency control circuit 26 judges the change to be one for lowering the frequency from f1 to f2.

Due to this, the frequency control circuit 26 instructs the clock pulse generation circuit 22 by the control signal S261 to lower the frequency of the system clock SYSCLK to be supplied to the target circuit 21 (ST15 in FIG. 13).

Consequently, the clock pulse generation circuit 22, as shown in FIG. 12D, lowers the frequency of the system clock SYSCLK for the target circuit 21 from f1 to f2 (ST15 in FIG. 13).

Then, the frequency control circuit 26 instructs the clock pulse generation circuit 22 by the control signal S261 to lower the frequency of the clock CLK to the frequency-voltage conversion circuit 23 (ST16 in FIG. 13).

As a result, the clock pulse generation circuit 22, as shown in FIG. 12C, lowers the frequency of the clock CLK for the frequency-voltage conversion circuit 23 from f1 to f2.

Note that if the clock pulse generation circuit 22 is capable of switching the system clock SYSCLK supplied to the target circuit 21 and the clock CLK supplied to the frequency-voltage conversion circuit 23 simultaneously, the two may be switched simultaneously.

As explained above, according to the third embodiment, since there are provided a clock pulse generation circuit 22 capable of generating a clock of multiple levels of clock frequency, generating a system clock SYSCLK having a frequency separately instructed by the control signal S261 from the frequency control circuit 26 and supplying it to the target circuit 21 at an instructed timing, and supplying a clock CLK having a separately instructed frequency to the frequency-voltage conversion circuit at an instructed timing, a frequency-voltage conversion circuit 23 for judging whether the power-supply voltage supplied from the power-supply voltage generation circuit 24 is high or low relative to the frequency of the clock CLK supplied from the clock pulse generation circuit 22, instructing the power-supply voltage generation circuit 24 by a signal S23 to lower the power-supply voltage when the power-supply voltage is high, while instructing the power-supply voltage generation circuit 24 by the signal S23 to raise the power-supply voltage when the power-supply voltage is low, a power-supply voltage generation circuit 24 for following an instruction from the frequency-voltage conversion circuit 23 to raise or lower the power-supply voltage $V_{DD}$ and supplying it to the target circuit 21 and the frequency-voltage conversion circuit 23, and a frequency control circuit 26 capable of separately controlling the clock frequency supplied to the frequency-voltage conversion circuit 23 and the clock frequency supplied to the target circuit 21, raising the clock frequency supplied to the frequency-voltage conversion circuit 23 and raising the clock frequency supplied to the target circuit 21 after a sufficient time for the power-supply voltage to rise has passed when raising the frequency, while lowering the clock frequency supplied to the target circuit 21 and successively lowering the clock frequency supplied to the frequency-voltage conversion circuit 23 when lowering the frequency, the effects below can be obtained.

Namely, by being able to separately control clocks supplied to the target circuit 21 and to the frequency-voltage conversion circuit 23, the power-supply voltage can be raised before switching the frequency of the target circuit 21.

Also, the technique of reducing the power consumption by the frequency-voltage conversion circuit 23 can be applied to a system with a plurality of clocks.

Also, the time to raise the power-supply voltage in advance can be suppressed to a minimum by the timer counting the time.

Furthermore, by using data of the frequency-voltage conversion circuit 23, the power-supply voltage can be measured and there is an advantage that the reliability of the system is improved.

Fourth Embodiment

Figure 14:
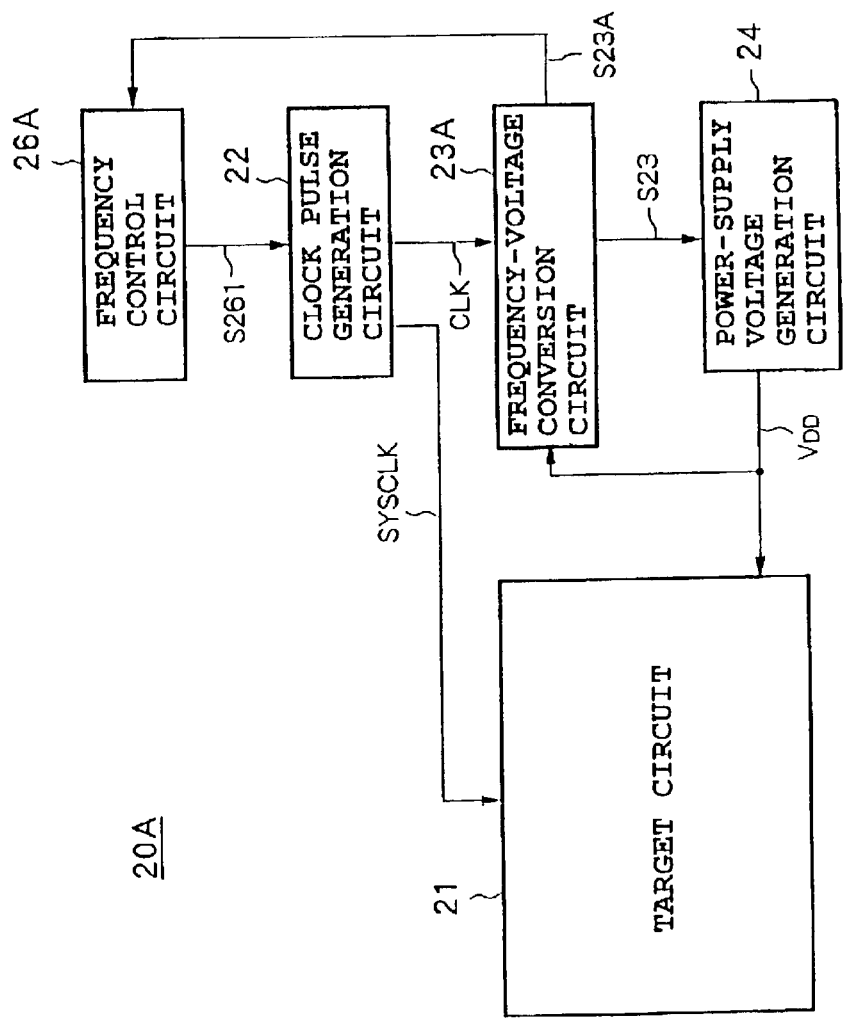
FIG. 14 is a block diagram of a fourth embodiment of an electronic circuit system employing a power-supply voltage frequency control circuit according to the present invention.

FIG. 14 is a block diagram of a fourth embodiment of an electronic circuit system employing a power-supply voltage frequency control circuit according to the present invention.

The fourth embodiment differs from the third embodiment in that no timer is provided.

Therefore, a frequency-voltage conversion circuit 23A according to the fourth embodiment is configured to judge whether a power-supply voltage $V_{DD}$ supplied from the power-supply voltage generation circuit 24 is high or low relative to the frequency of a supplied clock CLK and notify the result to the frequency control circuit 26 by a signal S23A.

The frequency control circuit 26 according to the third embodiment detected the time T1 when the power-supply voltage converged to V1 by the timer 25. The frequency control circuit 26A according to the present embodiment detects the time T1 from the judgment result of the frequency-voltage conversion circuit 23. In other words, it judges whether the power-supply voltage $V_{DD}$ is converged to V1 or not. After confirming that the power-supply voltage $V_{DD}$ is converged (raised) to V1, it instructs to raise the frequency of the system clock SYSCLK to be supplied to the target circuit 21.

This is because while the frequency-voltage conversion circuit 23A is instructing to raise the power-supply voltage, the power-supply voltage is still not converged.

Figure 15:
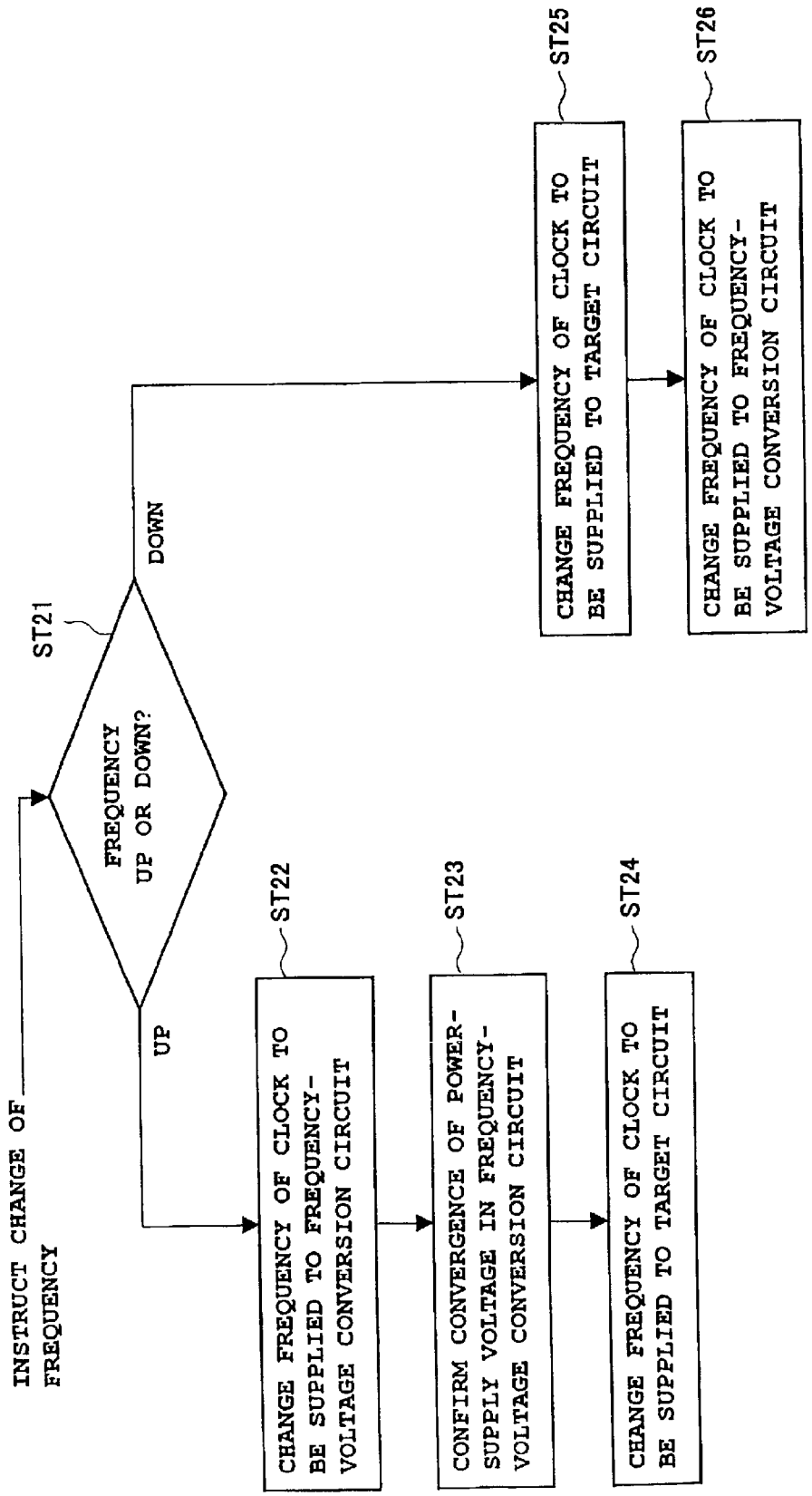
FIG. 15 is a flow chart for explaining a control operation for changing a clock frequency and a power-supply voltage of a frequency control circuit in the fourth embodiment.

FIG. 15 is a flow chart for explaining a control operation for changing a clock frequency and a power-supply voltage of a frequency control circuit according to the present embodiment.

When receiving a frequency change instruction of a system clock SYSCLK for the target circuit 21 from a not shown control system, the frequency control circuit 26A according to the fourth embodiment judges whether to perform an operation for raising the frequency or an operation for lowering it from the instructed frequency (ST21 in FIG. 15). When raising the frequency, it instructs the clock pulse generation circuit 22 by the control signal S261 to raise the frequency of the clock CLK for the frequency-voltage conversion circuit 23A (ST22 in FIG. 15). When confirming convergence of the power-supply voltage $V_{DD}$ by the signal S23A from the frequency-voltage conversion circuit 23A (ST23 in FIG. 15), it instructs the clock pulse generation circuit 22 by the control signal S261 to raise the system clock SYSCLK for the target circuit 21 (ST24 in FIG. 15).

When judging to lower the frequency, the frequency control circuit 26A instructs the clock pulse generation circuit 22 by the control signal S261 to lower the frequency of the system clock SYSCLK to be supplied to the target circuit 21 (ST25 in FIG. 15) and instructs the clock pulse generation circuit 22 by the control signal S261 to lower the clock CLK for the frequency-voltage conversion circuit 23 (ST26 in FIG. 15).

According to the fourth embodiment, the same effects as those in the third embodiment can be obtained.

Fifth Embodiment

Figure 16:
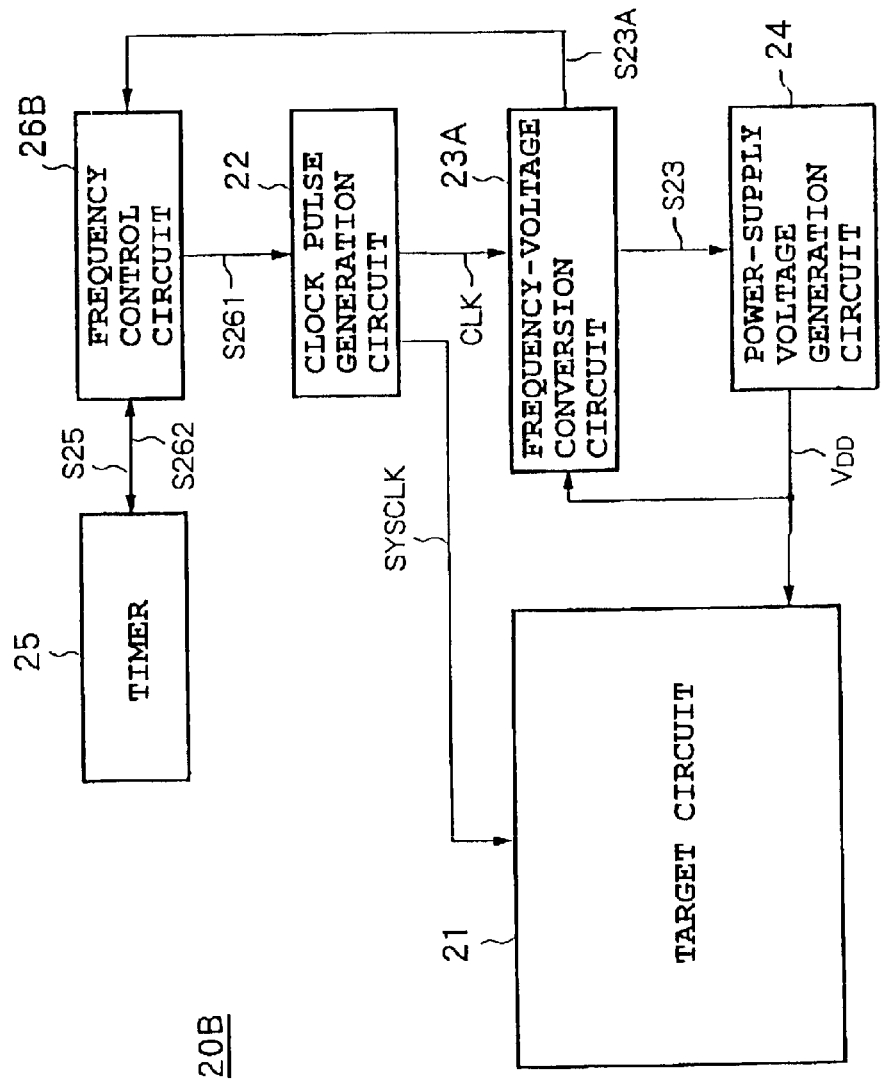
FIG. 16 is a block diagram of a fifth embodiment of an electronic circuit system employing a power-supply voltage frequency control circuit according to the present invention.

FIG. 16 is a block diagram of a fifth embodiment of an electronic circuit system employing a power-supply voltage frequency control circuit according to the present invention.

The fifth embodiment employs both the method of detecting a time T1 to raise a frequency of a system clock SYSCLK supplied to the target circuit 21 by a time clocked by the timer 25 according to the third embodiment and the method of determining when change of a power-supply voltage is converged from a judgment result of the frequency-voltage conversion circuit 23A according to the fourth embodiment.

FIG. 17 is a flow chart for explaining a control operation for changing a clock frequency and power-supply voltage of a frequency control circuit according to the fifth embodiment.

When receiving a frequency change instruction for the system clock SYSCLK for the target circuit 21 from a not shown control system, the frequency control circuit 26B according to the fifth embodiment judges whether to perform an operation for raising the frequency or an operation for lowering the frequency from the instructed frequency (ST31 in FIG. 17). When raising the frequency, it instructs the clock pulse generation circuit 22 by a control signal S261 to raise the frequency of the clock CLK supplied to the frequency-voltage conversion circuit 23A (ST32 in FIG. 17), sets a required time for raising the power-supply voltage $V_{DD}$ at the frequency in the comparison register 252 of the timer 25, detects a coincidence signal S25 from the timer 25 (ST33 in FIG. 17), and, when confirming convergence of the power-supply voltage $V_{DD}$ by a signal S23A from the frequency-voltage conversion circuit 23A (ST34 in FIG. 17), instructs the clock pulse generation circuit 22 by the control signal S261 to raise the frequency of the system clock SYSCLK supplied to the target circuit 21 (ST35 in FIG. 17).

When judging to perform an operation for lowering the frequency, the frequency control circuit 26B instructs the clock pulse generation circuit 22 by a control signal S261 to lower the frequency of the system clock SYSCLK supplied to the target circuit 21 (ST36 in FIG. 17) and instructs the clock pulse generation circuit 22 by the control signal S261 to lower the frequency of the clock CLK supplied to the frequency-voltage conversion circuit 23A (ST37 in FIG. 17).

According to the fifth embodiment, by detecting the time T1 to raise the frequency of the system clock SYSCLK to be supplied to the target circuit 21 by the timer 25 and confirming that the power-supply voltage is converged to a desired value from the judgment result of the frequency-voltage conversion circuit 23A, there is an, advantage that frequency control with higher reliability can be realized.

Summarizing the effects of the invention, as explained above, according to the present invention, it is not necessary for a CPU or other circuit for controlling a target circuit (system) to control the system while managing time, no interruption processing etc. occurs, and the load on the system side is reduced.

Also, the target circuit side only has to control the frequency. There is no load to control a power-supply voltage.

Furthermore, the target circuit side can give an instruction of change at any time. Processing may be performed when it is unoccupied by normal processing, so the load of scheduling is small.

According to the present invention, since the clocks to be supplied to the target circuit and the frequency-voltage conversion circuit can be separately controlled, it is possible to raise the power-supply voltage before switching the frequency of the target circuit.

Also, the technique of reducing the power consumption by the frequency-voltage conversion circuit can be applied to a system with a plurality of clocks.

Also, the time to raise the power-supply voltage in advance can be suppressed to a minimum by the timer counting the time.

Furthermore, by using data of the frequency-voltage conversion circuit, the power-supply voltage can be measured and there is an advantage that the reliability of the system is improved.

Note that the embodiments explained above were described to facilitate the understanding of the present invention and not to limit the present invention. Accordingly, elements disclosed in the above embodiments include all design modifications and equivalents belonging to the technical field of the present invention.

What is claimed is:

1. A power-supply voltage frequency control circuit, comprising:
   a clock supply circuit capable of supplying system clocks of a plurality of clock frequencies and supplying a system clock having a clock frequency in accordance with a first control signal to a target circuit performing processing in synchronization with the system clock;
   a power-supply voltage supply circuit for supplying a power-supply voltage of a value in accordance with a second control signal to the target circuit; and
   a control means for, when giving an instruction for raising the frequency, instructing the power-supply voltage supply circuit by the second control signal to raise the power-supply voltage in advance to one by which operation of the system can be assured for the frequency to be changed and then instructing the clock supply circuit by the first control signal to raise the frequency.

2. A power-supply voltage frequency control circuit as set forth in claim 1, wherein the control means, when giving an instruction for lowering the frequency, instructs the clock supply circuit by the first control signal to lower the frequency and instructs the power-supply voltage supply circuit by the second signal to lower the power-supply voltage to one by which operation of the system can be assured for the frequency to be changed.

3. A power-supply voltage frequency control circuit, comprising:
   a clock supply circuit capable of supplying system clocks of a plurality of clock frequencies and supplying a system clock of a clock frequency in accordance with a first control signal to a target circuit performing processing in synchronization with the system clock;
   a power-supply voltage supply circuit for supplying a power-supply voltage of a value in accordance with a second control signal to the target circuit; and
   a control means for outputting the first control signal to the clock supply circuit and outputting the second control signal to the power-supply voltage supply circuit by following an instruction of a frequency change value and change time from the target circuit.

4. A power-supply voltage frequency control circuit as set forth in claim 3, wherein the control means calculates a power-supply voltage value to be supplied to the target circuit from the frequency change value instructed by the target circuit and instructs the power-supply voltage supply circuit by the second control signal.

5. A power-supply voltage frequency control circuit as set forth in claim 3, wherein the control means has a table of the relationship of a frequency value of a system clock to be supplied to the target circuit and a power-supply voltage value to be supplied to the target circuit, selects a voltage in accordance with an instructed frequency value, and instructs the power-supply voltage supply circuit by the second control signal.

6. A power-supply voltage frequency control circuit as set forth in claim 3, wherein the control means performs a frequency-voltage conversion from an instructed frequency value of a system clock to be supplied to the target circuit and instructs a power-supply voltage value obtained by the conversion to the power-supply voltage supply circuit by the second control signal.

7. A power-supply voltage frequency control circuit as set forth in claim 3, wherein
   the circuit further comprises a timer able to be set with a time to be clocked by the control means and outputting a coincidence signal clocking the set time, and
   the control means sets a frequency change time instructed by the target circuit to the timer and outputs the first control signal to the clock supply circuit when receiving as an input the coincidence signal from the timer.

8. A power-supply voltage frequency control circuit as set forth in claim 3, wherein the control means compares a frequency of the clock supplied by the clock supply circuit with the frequency change value instructed by the target circuit, judges whether to raise or lower the frequency in accordance with the comparison result, and instructs the clock supply circuit by the first control signal.

9. A power-supply voltage frequency control circuit as set forth in claim 8, wherein when judging to raise the frequency, the control means outputs to the power-supply voltage supply circuit the second control signal to raise the power-supply voltage at an earlier time than an instructed time and outputs to the clock supply circuit the first control signal to raise the system clock frequency to an instructed frequency value at the instructed time.

10. A power-supply voltage frequency control circuit as set forth in claim 9, wherein
    the circuit further comprises a timer able to be set with a time to be clocked by the control means and outputting a coincidence signal for clocking the set time, and
    the control means calculates a time to raise the power-supply voltage from a time of raising the frequency, sets a time based on the calculated time to the timer, and outputs the second control signal to the power-supply voltage supply circuit when receiving as an input the coincidence signal from the timer.

11. A power-supply voltage frequency control circuit as set forth in claim 8, wherein when judging to lower the frequency, at an instructed time, the control means outputs to the clock supply circuit the first control signal to lower the system clock frequency to an instructed frequency value and outputs to the power-supply voltage supply circuit the second control signal to lower the power-supply voltage.

12. A power-supply voltage frequency control circuit as set forth in claim 8, wherein the control means outputs to the power-supply voltage supply circuit the second control signal to raise the power-supply voltage at an earlier time than an instructed time and outputs to the clock supply circuit the first control signal to raise the system clock frequency to an instructed frequency value at an instructed time when judging to raise the frequency, while it outputs to the clock supply circuit the first control signal to lower the system clock frequency to an instructed frequency value at an instructed time and outputs to the power-supply voltage supply circuit the second control signal to lower the power-supply voltage when judging to lower the frequency.

13. A power-supply voltage frequency control circuit as set forth in claim 12, wherein the circuit further comprises a timer able to be set with a time to be clocked by the control means and outputting a coincidence signal for clocking the set time, and the control means calculates a time to raise the power-supply voltage from a time of raising the frequency, sets a time based on the calculated time to the timer, and outputs the second control signal to the power-supply voltage supply circuit when receiving as an input the coincidence signal from the timer.

14. A power-supply voltage frequency circuit comprising:

a frequency-voltage conversion circuit for judging whether a power-supply voltage is high or low relative to a supplied clock frequency and outputting a voltage instruction signal to instruct to lower the power-supply voltage when higher and to raise it when lower;

a control means for outputting a control signal to instruct a frequency change in accordance with an instruction of the frequency change value;

a clock supply circuit capable of supplying system clocks of a plurality of clock frequencies and supplying a system clock of a clock frequency in accordance with the control signal separately to a target circuit for performing processing in synchronization with the system clock and to the frequency-voltage conversion circuit; and a power-supply voltage supply circuit for supplying a power-supply voltage in accordance with the voltage instruction signal to the target circuit and frequency-voltage conversion circuit.

15. A power-supply voltage frequency control circuit as set forth in claim 14, wherein, when receiving an instruction to raise the frequency, the control means instructs the clock supply circuit by the control signal to raise a clock frequency to be supplied to the frequency-voltage conversion circuit and to raise a clock frequency to be supplied to the target circuit after the elapse of a time sufficient time for the power-supply voltage to rise.

16. A power-supply voltage frequency control circuit as set forth in claim 14, wherein, when receiving an instruction to lower the frequency, the control means instructs the clock supply circuit by the control signal to lower the clock frequency to be supplied to the target circuit and then to lower the clock frequency to be supplied to the frequency-voltage conversion circuit.

17. A power-supply voltage frequency control circuit as set forth in claim 14, wherein, when receiving an instruction to lower the frequency, the control means instructs the clock supply circuit by the control signal to simultaneously lower the clock frequency to be supplied to the frequency-voltage conversion circuit and the clock frequency to be supplied to the target circuit at the same time.

18. A power-supply voltage frequency control circuit as set forth in claim 14, wherein the control means instructs the clock supply circuit by the control signal to raise the clock frequency to be supplied to the frequency-voltage conversion circuit and to supply to the target circuit after the elapse of a time sufficient for the power-supply voltage to rise when receiving an instruction to raise the frequency and instructs the clock supply circuit by the control signal to lower the clock frequency to be supplied to the target circuit and then to lower the clock frequency to be supplied to the frequency-voltage conversion circuit when receiving an instruction to lower the frequency.

19. A power-supply voltage frequency control circuit as set forth in claim 14, wherein the control means instructs the clock supply circuit by the control signal to raise the clock frequency to be supplied to the frequency-voltage conversion circuit and to raise the clock frequency to be supplied to the target circuit after the elapse of a time sufficient for the power-supply voltage to rise when receiving an instruction to raise the frequency and instructs the clock supply circuit by the control signal to simultaneously lower the clock frequency to be supplied to the frequency-voltage conversion circuit and the clock frequency to be supplied to the target circuit when receiving an instruction to lower the frequency.

20. A power-supply voltage frequency control circuit as set forth in claim 15, wherein the circuit further comprises a timer able to be set with time to be clocked by the control means and for outputting a coincidence signal for clocking the set time, and the control means calculates a time to raise the power-supply voltage from a time of raising the frequency, sets a time based on the calculated time at the timer, and instructs the clock frequency circuit by the control signal to raise the clock frequency to be supplied to the target circuit when receiving as an input the coincidence signal from the timer.

21. A power-supply voltage frequency control circuit as set forth in claim 18, wherein the circuit further comprises a timer able to be set with time to be clocked by the control means and for outputting a coincidence signal for clocking the set time, and the control means calculates a time to raise the power-supply voltage from a time of raising the frequency, sets a time based on the calculated time at the timer, and instructs the clock frequency circuit by the control signal to raise the clock frequency to be supplied to the target circuit when receiving as an input the coincidence signal from the timer.

22. A power-supply voltage frequency control circuit as set forth in claim 19, wherein the circuit further comprises a timer able to be set with time to be clocked by the control means and for outputting a coincidence signal for clocking the set time, and the control means calculates a time to raise the power-supply voltage from a time of raising the frequency, sets a time based on the calculated time at the timer, and instructs the clock frequency circuit by the control signal to raise the clock frequency to be supplied to the target circuit when receiving as an input the coincidence signal from the timer.

23. A power-supply voltage frequency control circuit as set forth in claim 15, wherein the control means detects that the power-supply voltage has risen, confirms that the power-supply voltage has risen, then instructs the clock supply circuit by the control signal to raise the clock frequency to be supplied to the target circuit.

24. A power-supply voltage frequency control circuit as set forth in claim 18, wherein the control means detects that the power-supply voltage has risen, confirms that the power-supply voltage has risen, then instructs the clock supply circuit by the control signal to raise the clock frequency to be supplied to the target circuit.

25. A power-supply voltage frequency control circuit as set forth in claim 19, wherein the control means detects that the power-supply voltage has risen, confirms that the power-supply voltage has risen, then instructs the clock supply circuit by the control signal to raise the clock frequency to be supplied to the target circuit.

26. A power-supply voltage frequency control circuit as set forth in claim 15, wherein the circuit further comprises a timer able to be set with time to be clocked by the control means and outputting a coincidence signal clocking the set time, and the control means calculates a time to raise the power-supply voltage from a time of raising the frequency, sets a time based on the calculated time to the timer, receives as input the coincidence signal from the timer, detects that the power-supply voltage has risen, confirms that the power-supply voltage has risen, then instructs the clock supply circuit by the control signal to raise the clock frequency to be supplied to the target circuit.

27. A power-supply voltage frequency control circuit as set forth in claim 18, wherein the circuit further comprises a timer able to be set with time to be clocked by the control means and outputting a coincidence signal clocking the set time, and the control means calculates a time to raise the power-supply voltage from a time of raising the frequency, sets a time based on the calculated time to the timer, receives as input the coincidence signal from the timer, detects that the power-supply voltage has risen, confirms that the power-supply voltage has risen, then instructs the clock supply circuit by the control signal to raise the clock frequency to be supplied to the target circuit.

28. A power-supply voltage frequency control circuit as set forth in claim 19, wherein the circuit further comprises a timer able to be set with time to be clocked by the control means and outputting a coincidence signal clocking the set time, and the control means calculates a time to raise the power-supply voltage from a time of raising the frequency, sets a time based on the calculated time to the timer, receives as input the coincidence signal from the timer, detects that the power-supply voltage has risen, confirms that the power-supply voltage has risen, then instructs the clock supply circuit by the control signal to raise the clock frequency to be supplied to the target circuit.

* * * * *